United States Patent
Nakashima

(10) Patent No.: US 10,395,402 B2
(45) Date of Patent: Aug. 27, 2019

(54) APPARATUS, SYSTEM AND METHOD FOR EMBEDDING DATA IN AN IMAGE FILE

(71) Applicants: Canon Information and Imaging Solutions, Inc., Melville, NY (US); Canon U.S.A., Inc., Melville, NY (US)

(72) Inventor: Kosuke Nakashima, Great Neck, NY (US)

(73) Assignees: CANON INFORMATION AND IMAGING SOLUTIONS, INC., Melville, NY (US); CANON U.S.A., INC., Melville, NY (US)

(*) Notice: Subject to any disclaimer, the term of this patent is extended or adjusted under 35 U.S.C. 154(b) by 434 days.

(21) Appl. No.: 14/721,975

(22) Filed: May 26, 2015

(65) Prior Publication Data

US 2016/0350269 A1  Dec. 1, 2016

(51) Int. Cl.
*G06F 17/00* (2006.01)
*G06T 11/60* (2006.01)
*H04N 1/32* (2006.01)
*G06F 17/21* (2006.01)
*G06F 17/24* (2006.01)
(Continued)

(52) U.S. Cl.
CPC ......... *G06T 11/60* (2013.01); *H04N 1/32144* (2013.01); *G06F 17/211* (2013.01); *G06F 17/2247* (2013.01); *G06F 17/24* (2013.01); *G06Q 10/10* (2013.01); *H04N 2201/0081* (2013.01)

(58) Field of Classification Search
CPC ........... G06F 17/3024; G06F 17/30011; G06F 17/24; G06F 17/211; G06F 3/1204; G06F 17/2247; G06Q 10/10

USPC ......... 715/230, 232–243; 345/1.15; 358/1.15
See application file for complete search history.

(56) References Cited

U.S. PATENT DOCUMENTS 5,646,997 A   7/1997  Barton
7,805,673 B2  9/2010  der Quaeler
(Continued)

OTHER PUBLICATIONS http://www.laserfiche.com/solutionexchange/article/managing-documents-during-litigation PIETER NAUTA, "Managing Documents During Litigation" accessed on Dec. 12, 2014, Lasertiche.
(Continued)

*Primary Examiner* — Quoc A Tran
(74) *Attorney, Agent, or Firm* — Canon U.S.A., Inc., IP Division

(57) ABSTRACT

An image processing device is provided to generate electronic document data representative of at least one physical document having at least one page. A unique document identifier value is determined to identify the at least one page, the unique document identifier being determined based on an end document identifier value associated with an electronic document project managed by a document management system. An annotated electronic document is generated by embedding data representing the unique document identifier within the at least one page of the electronic document data. An information file is generated and includes at least one characteristic associated with the annotated electronic document. The information file and annotated electronic document are communicated to the document management system for incorporation into an associated electronic document project stored therein.

19 Claims, 15 Drawing Sheets

(51) Int. Cl.
*G06Q 10/10* (2012.01)
*G06F 17/22* (2006.01)

(56) References Cited

U.S. PATENT DOCUMENTS

| | | | | |
|---|---|---|---|---|
| 2004/0036914 A1* | 2/2004 | Kropf | .................. | G06F 17/243 358/1.18 |
| 2008/0120209 A1* | 5/2008 | Krolczyk | ............... | G06Q 10/10 705/30 |
| 2009/0063189 A1* | 3/2009 | Hupke | .................. | G16H 40/20 382/209 |
| 2009/0161149 A1* | 6/2009 | Noguchi | ............ | H04N 1/00334 358/1.15 |
| 2011/0229035 A1* | 9/2011 | Sohma | ............... | G06K 9/00469 382/176 |
| 2012/0205432 A1* | 8/2012 | Stone | .................... | G06Q 10/10 235/375 |
| 2013/0215475 A1* | 8/2013 | Noguchi | ............ | H04N 1/32106 358/448 |

OTHER PUBLICATIONS http://www.notablesolutions.com/products/autostore/capture/multifunction-devices/lexmark/ "Notable Solutions Web Page" accessed on May 26, 2015, Nuance.
http://www.nuance.com/for-business/by-product/ecopy/ecopy-connectors-and-extenders/nuance-developed/extenders/bates-extender/index.htm "eCopy Connectors and Extenders" published by eCopy, 2014.
http://www.mbsworks.com/wp-content/uploads/eCopy_BatesNumbering_US_datasheet_KM.pdf "eCopy Bates Numbering Service" published by Konica Minolta, 2009.

* cited by examiner

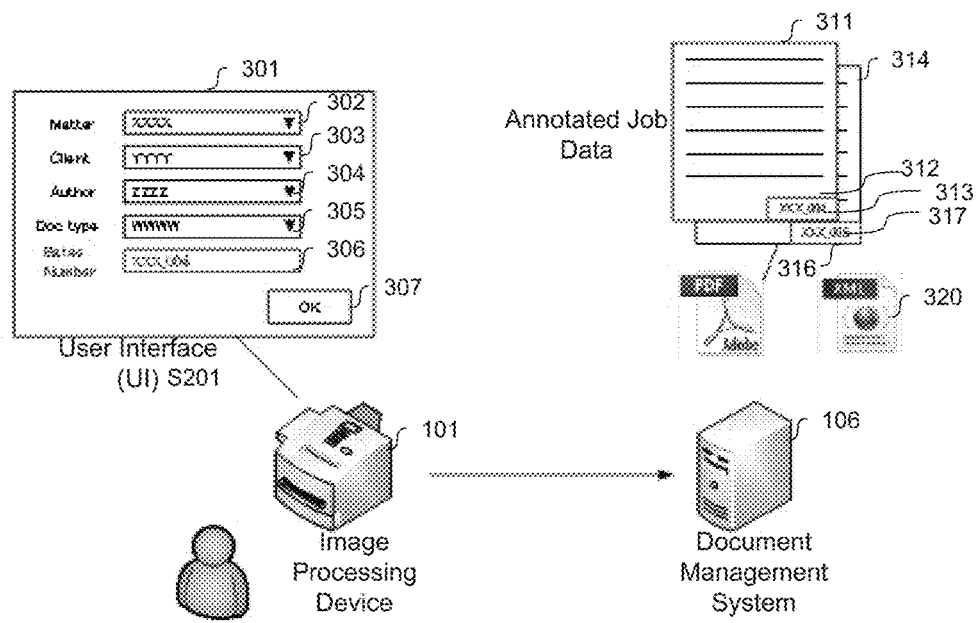
FIG. 3
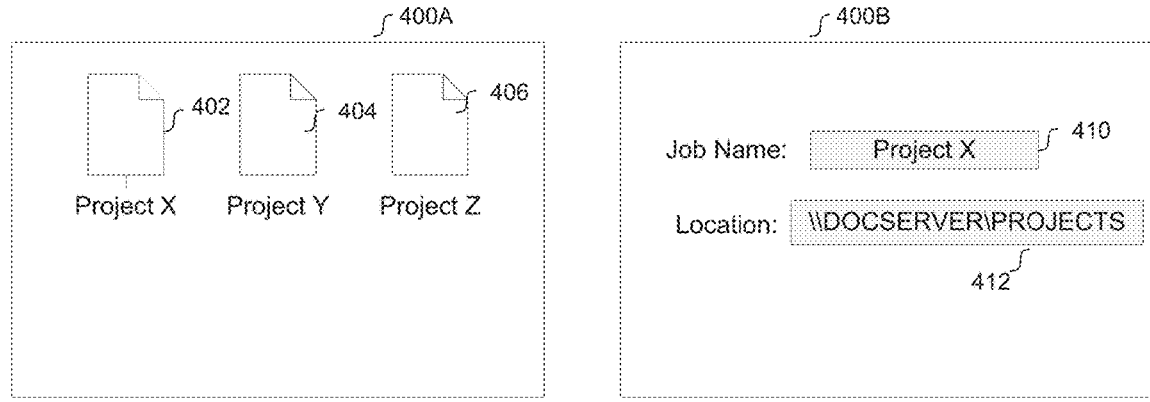
FIG. 4A
FIG. 4B

```
                                                    ┌800A
         <?xml version = "1.0"?>
    303 ┌<Project_X>
         <DocId_Format>
              <Format structure="ProjChar_DocID"/> ┌303
              <ProjChar name="Matter"/>
         </DocID_Format>              ┐303

<Begin Next Doc>    ┌303
              <DocID start="0015"/>

</Begin Next Doc>

</Project_X>
```

FIG. 8A

```
                                                 ┌800B
         <?xml version = "1.0"?>
         <Project_X>
    805 ┌   <Doc_Characteristics>           ┌826
              <Char_1>Matter</Char_1>  ┌827
              <Char_2>Client</Char_2>┘ ┌828
    825      <Char_3>Author</Char_3>┘ ┌829
              <Char_4>Doc Type</Char_4>┘
            </Doc_Characteristics>

<DocId_Format>
              <Format structure="ProjChar_DocID"/> ┌812
    810      <ProjChar name="Matter"/>
            </DocID_Format>           ┐814

┌ ┌Doc1>              ┌832
    831─┤  <DocID start="0001"/>
         │ <DocID end="0004"/>
         └ /Doc1>               ┐833

┌ ┌Doc2>              ┌835
    834─┤  <DocID start="0005"/>
    830  │ <DocID end="0005"/>
         └ /Doc2>               ┐836

┌ ┌:Doc3>              ┌838
    837─┤  <DocID start="0006"/>
         │ <DocID end="0010"/>
         └ :/Doc3>              ┐839
         </Project_X>
```

FIG. 8B

```xml
<?xml version = "1.0"?>
<Project_X>
    <DocId_Format>
        <Format structure="ProjChar_DocID"/>
        <ProjChar name="Matter"/>
    </DocID_Format>
    <Doc1>
        <Doc_Characteristics>
            <Matter name ="XXXX"/>
            <Client name ="YYYY"/>
            <Author name ="ZZZZ"/>
            <Doc_Type name ="PDF"/>
        </Doc_Characteristics>
        <DocID start="0001"/>
        <DocID end="0004"/>
    </Doc1>
    <Doc2>
        <Doc_Characteristics>
            <Matter name ="XXXX"/>
            <Client name ="YYYY"/>
            <Author name ="ZZZZ"/>
            <Doc_Type name ="JPG"/>
        </Doc_Characteristics>
        <DocID start="0005"/>
        <DocID end="0005"/>
    </Doc2>
    <Doc3>
        <Doc_Characteristics>
            <Matter name ="XXXX"/>
            <Client name ="YYYY"/>
            <Author name ="ZZZZ"/>
            <Doc_Type name ="PDF"/>
        </Doc_Characteristics>
        <DocID start="0006"/>
        <DocID end="0010"/>
    </Doc3>
</Project_X>
```

FIG. 8C

APPARATUS, SYSTEM AND METHOD FOR EMBEDDING DATA IN AN IMAGE FILE

BACKGROUND OF THE INVENTION

Field of the Invention

The present invention relates generally to processing image data files and, more specifically, to embedding data within image files.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task.

Often times image processing devices are used to generate electronic versions of hardcopy documents which may then be recognized, categorized and analyzed for certain task-specific information. Certain drawbacks exist when it comes to integrating electronic versions of documents within a set of other electronic documents. A system according to invention principles remedies any drawbacks associated with these conventional systems.

BRIEF SUMMARY OF THE INVENTION

Methods, systems, and computer-readable media for processing image file data are described.

In one embodiment, an image processing device is provided and includes one or more processors and one or more computer-readable media coupled to the one or more processors, the one or more computer-readable media storing instructions that, when executed by the one or more processors, cause the one or more processors to generate electronic document data representative of at least one physical document having at least one page. A unique document identifier value is determined to identify the at least one page, the unique document identifier being determined based on an end document identifier value associated with an electronic document project managed by a document management system. An annotated electronic document is generated by embedding data representing the unique document identifier within the at least one page of the electronic document data. An information file is generated and includes at least one characteristic associated with the annotated electronic document. The information file and annotated electronic document are communicated to the document management system for incorporation into an associated electronic document project stored therein.

A method of operating an image processing device is provided. The method includes generating electronic document data representative of at least one physical document having at least one page and determining a unique document identifier value to identify the at least one page, the unique document identifier being determined based on an end document identifier value associated with an electronic document project managed by a document management system. The method further includes generating an annotated electronic document by embedding data representing the unique document identifier within the at least one page of the electronic document data and generating an information file including at least one characteristic associated with the annotated electronic document, The information file and the annotated electronic document are then communicated to the document management system for incorporation into an associated electronic document project stored therein.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 illustrates an diagrammatic flow according to invention principles.

FIGS. 4A & 4B illustrate exemplary graphical user interface (GUI) display presented on an image processing device according to invention principles.

FIGS. 8A, 8B and 8C illustrate exemplary data objects used in accordance with invention principles.

DETAILED DESCRIPTION OF THE INVENTION

Figure 1:
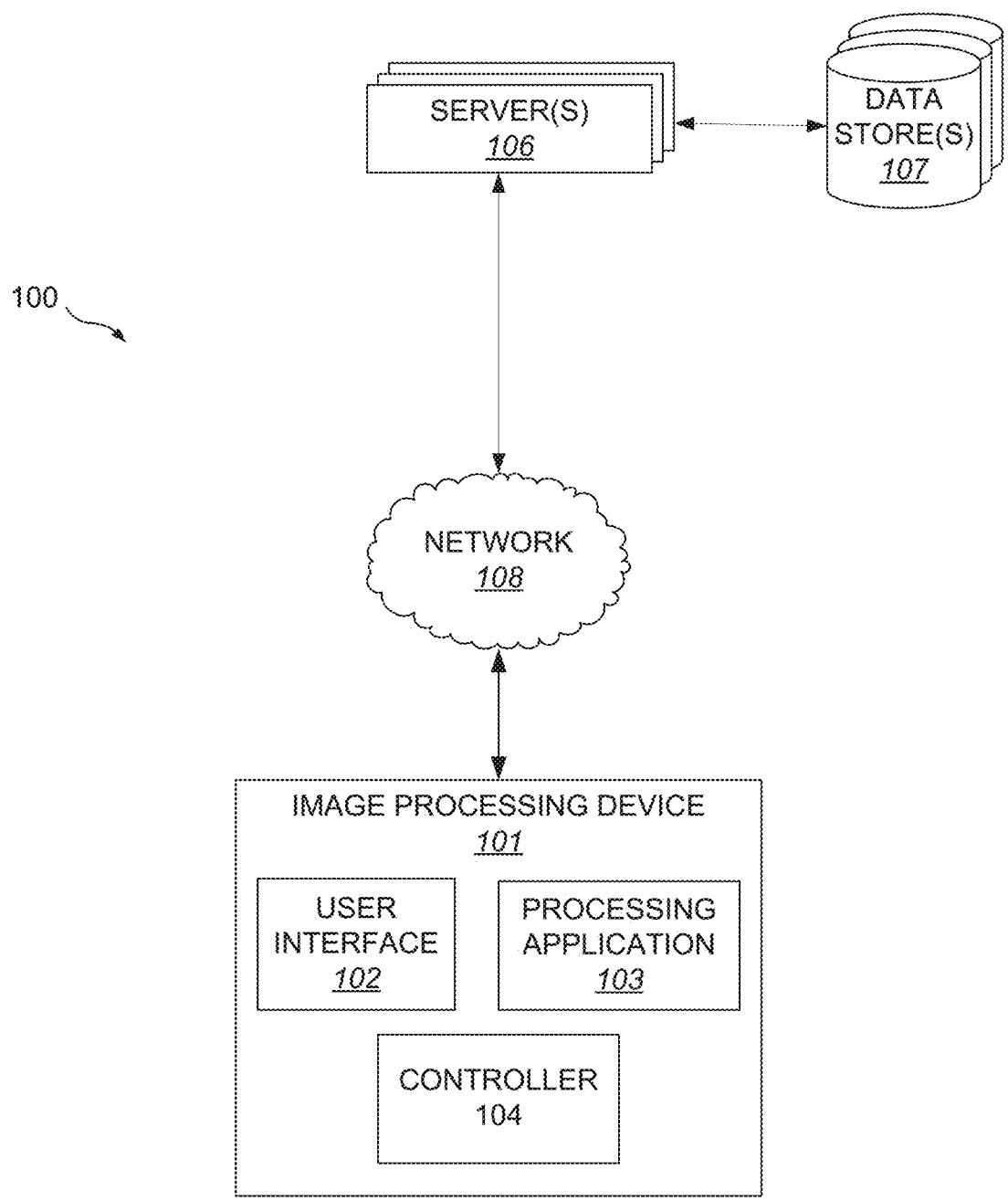
FIG. 1 illustrates an exemplary network environment.

Embodiments of the present invention are described with reference to the drawings. FIG. 1 illustrates an example network environment 100. The networked environment 100 depicts an image processing device 101 and at least one server 106 electrically and communicatively coupled to at least one data store 107. The image processing device 101 and the at least one server 106 are communicatively coupled to one another via a communication network 108. The number and types of devices shown herein are provide for purposes of example only and should not be construed as limiting in terms of number and types of devices able to be interconnected by communication network 108.

The device environment depicted in FIG. 1 and described throughout the following description illustrates a system that allows for a user to annotate individual pages of one or more electronic document files that form part of an electronic document project. In certain embodiments, electronic document data is generated by one or more image processing devices 101 by scanning or otherwise digitizing one or more pages of a hard copy document. In other embodiments, the image processing device may search for and acquire previously created electronic document data from a data store. These examples are provided to illustrate that the image processing device 101, as will be discussed hereinafter, includes one or more applications executing thereon which allows for annotation of respective pages of an electronic document which, itself, represents one electronic document in a set of electronic documents referred to hereinafter as an electronic document project.

The image processing device 101 includes hardware, software, or both for providing the functionality of the image processing device 101. In some embodiments, the image processing device 150 includes hardware, software, or both for providing scanning/copying functionality. For example, the image processing device 150 may include an image sensor or a camera for capturing an image. In some embodiments, the image processing device 150 scans a physical document to generate electrical signals which are converted to digital image data representing the scanned physical document. The image processing device 150 may convert the digital image data into an electronic document or image file representing the scanned physical document and send the electronic document to a destination.

As shown herein, the image processing device 101 includes a user interface 102, a memory having at least one application 103 stored therein, and a controller 104 that executes the processing functions including but not limited to, accessing and executing application 103 and generating a plurality of graphical user interfaces for display by (or on) the user interface 102. The depiction of components of the image processing device 101 shown in FIG. 1 should not be construed as limiting and additional hardware components and circuits that comprise the image processing device will be described hereinafter with respect to FIG. 12, the complete description of which is applicable to image processing device 101 of FIG. 1.

The image processing device 101 performs one or more steps of one or more methods described or illustrated herein. In some embodiments, software running on the image processing device 101 performs one or more steps of one or more methods described or illustrated herein to provide functionality described or illustrated herein. By way of example, the image processing device 101 may include at least one processor that can execute at least one set of instructions stored in at least one type of memory in order to provide the functionality described herein.

In some embodiments, the image processing device 101 includes one more application 103 including one or more programs for controlling access to one or more resources on the image processing device 101. In some embodiments, the application 103 includes one or more programs for controlling access to the application 103 and/or particular functionality of the application 103. In some embodiments, access to one or more resources of the application 103 is controlled based on a credential associated with the entity attempting to access the one or more resources of the application 103. Policies for controlling access to various resources of the application 103 may be stored at the image processing device 101. In other embodiments, access control policies may reside in a centralized or enterprise server remotely located from the image processing device 101.

Once access to the application 103 is granted, a user gains access to one or more resources of the application 103, including task-specific functionality of the application 103. The task-specific functionality of the application 103 may enable the user to perform one or more tasks using the application 103. For example, the application 103 may provide various functions, features and user interfaces for processing image data, transmitting data over a network, managing one or more databases, or other tasks. In some embodiments, the application 103 is configured to use one or more resources of the image processing device 101 to perform a process in response to an instruction from the user.

For example, the application 103 may use functionality of and/or information on the image processing device 101 to employ hardware, software, or both for that provides scanning functionality. For example, the image processing device 101 may include an image sensor or a camera for capturing an image. In some embodiments, the image processing device 101 scans a physical document to generate electrical signals which are converted to digital image data representing the scanned physical document. The digital image data may be converted into an electronic document (e.g. image file) representing the scanned physical document and sent to a destination. The electronic document (or image file) generated by the image processing device may include text and/or image data.

In certain embodiments, the application 103 executing on the image processing device 101 provides communication functionality for transmitting image file via the network 108 to any other computing system and/or server connected thereto. The communication functionality of the application 103 also enables the image processing device 101 to receive instruction data from other systems on the network 108 enabling access to and control of any functionality provided by application 103. The communication functionality of application 103 may also enable the image processing device 101 to receive and process data objects generated by any system connected to the image processing device 101 via the network 108.

In some embodiments, the application 103 executing on the image processing device 101 provides functionality for maintaining and accessing information in a data structure, which may be any suitable data structure for organizing data. For example, information associated with a user or process may be added as one or more entries into a data structure. The application 103 executing on the image processing device 101 may store and/or retrieve data in a memory or on a hard disk of the image processing device 150. In some embodiments, the image processing device 101, when executing the application 103, may perform various operations with respect to a data store. Examples of operations include adding entries to a data store; deleting entries from a data store; modifying entries in a data store; searching for entries in a data store; and retrieving entries from a data store. The data store management functionality provided by application 103 discussed above is also applicable to data stores located on remote computing systems and/or servers connected to the image processing device 101 via the network 108.

The application 103 executing on the image processing device 101 may provide functionality for generating information and providing the information to the user interface 112 of the image processing device 101. The information may include text, images, form elements, files, executable programs, or other suitable information. The information provided by the application 103 may include content for display on a display of the image processing device 101.

The at least one application 103 executed by the controller 104 of image processing device 101 may include at least one program that, when executed by one or more processors, cause the one or more processors to perform one or more operations described with respect to FIGS. 2-10.

In one exemplary embodiment, the application 103 is an annotation application that selectively modifies one or more pages of an electronic document that was either generated by or acquired the image processing device 101. Certain functionality of provided by application 103 when executed by one or more processors includes communicating with a document management system executing on one or more servers 106. The document management system of server 106 may organize and provide access to one or more electronic document projects stored on data stores 107. The application 103 may allow the image processing device 101 to selectively annotate one or more pages of an electronic document generated by the image processing device so that the annotated pages can be provided to and stored within an organizational structured defined by the document management system. One example of the type of organizational structure implemented for an electronic document project managed by a document management system may include bates numbering or stamping where each page of every document in an electronic document project is uniquely identified by a number. The document management system can manage and organize the marked pages that may be directly related to one another (e.g. all of the pages of a single document) and allow users to access one or more electronic documents stored therein. The description of bates numbering is provided for illustrative purposes only and a document management system may be selectively configured to mark and organize electronic documents in any manner so long as each electronic document page is assigned a unique identifier.

In one exemplary operation, application 103 enables a user to selectively generate one or more electronic documents and automatically annotate each page of the generated electronic document with a unique label value allowing for association with an electronic document project stored in and managed the document management system executing on server 106. Application 103 may receive a data object including electronic document project-specific data including at least a final value representing the total electronic document pages in a particular project. For example, if an electronic document project stored in data store 107 includes six (6) individual electronic documents totaling 100 electronic document pages, the data object acquired by application 103 may include the value "100" indicating the total number of electronic document pages in the project thereby notifying the application 103 to increment the value label on a subsequent electronic document. In other embodiments, the data object may also include project characteristics that provide information about one or more aspects of the project.

The application 103 transforms a data object representing an electronic document by accessing each individual page that forms the electronic document and, applying thereto, a unique label value having a predetermined labelling format. The applied unique labeling value is based on the data object received from the document management system whereby application 103 uses the final page number value and increments the value for each individual page that forms the electronic document data object. This annotation by embedding labelling data therein creates a new modified data object for transmission to and inclusion within the associated electronic document project. Additionally, the application 103 may generate a metadata file linked to and associated with the modified data object. The metadata file may include data representing job-specific information related to the job that resulted in generating the modified data object. The job specific information may include a total number of individual pages included in the modified electronic document data object. In another embodiment, the job specific information may include one or more characteristics associated with the job that created the modified data object.

In some embodiments, the application 103 may provide one or more of the above described functions by creating one or more data objects associated with one or more of the above functions. For example, the application 103 can create a data object that enables one of creating a file based on information contained in the data object, attaching a file to the data object and/or associating a file with the data object. The file may be any suitable file type used in providing the functionality of the application 103. The data object is information which may be incorporated in and/or used by the application 103. In some embodiments, the data object is processed as an entity distinct from other information or components incorporated in or used by the application 103. The data object may include information grouped together by the application 103. A representation of the data object may be presented in a graphical user interface (GUI) as a discrete unit, which may include one or more elements. In some embodiments, the data object may be stored in one or more locations. The data object may include one or more of the following: a data entry, a file, a portion of a file, executable code, a form element, an image, or other content. The application 103 and the associated data object may be any suitable software application and data object, respectively.

In some embodiments, the various functions of application 103 may output data to a user interface 112 (discussed below) for presentation to the user enabling the selectively identify particular electronic document projects that a current job is to be associated and to initiate a current job that will result in generation of a data object including the electronic document pages having been annotated for inclusion in the electronic document project. As used herein, a current job refers to the generation of an electronic document having one or more pages from a hard copy (e.g. paper) document. In other embodiments, the term current job may refer to acquisition, by the image processing device 101, of a data object representing a previously created electronic document that has not been annotated with a label value relating to a particular electronic document project.

The user interface 112 includes hardware, software, or both for providing the functionality of the user interface 112. The user interface may receive input signals from a user and generate output signals that are displayed by a display device. The display device may be embodied within the user interface 112 or electrically coupled thereto. The user interface 112 facilitates interaction between a user and the image processing device 101. In some embodiments, the user interface 112 facilitates the interaction between the image processing device 101 and the one or more servers 106 including the document management systems that manage one or more electronic document projects.

The user interface 112 may receive information from the application 103 that controls the operation of the user interface 112 to implement the functions of application 103. In some embodiments, the information received from the application 103 includes data objects defining the structure and type of output to be generated by the user interface 112. By way of non-limiting example, the application 103 may output data objects representative of elements to be included in a graphical user interface associated with at least one of the functions of application 103. The user interface 112 may use these data objects and generate the graphical user interface based on these data objects.

In some embodiments, the user interface 112 receives input data signals generated by an input/output (I/O) device in order to facilitate the interaction referenced above and described in further detail below. Exemplary I/O devices include but are not limited to keyboards, mouse, touch sensitive displays, microphones, gesture-based input devices and the like.

In certain embodiments, the application 103 of the image processing device 101 may include a browser executing thereon. The browser may be a web browser such as MICROSOFT INTERNET EXPLORER, GOGGLE CHROME or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 101 may have various add-ons, plug-ins, or other extensions for use in or with the browser.

In some embodiments, the browser may display a collection of text and image elements that are accessible by a user and which enable the user to perform any of the functionality set forth above with respect to application 103. In this type of embodiment, the functionality of application 103 may be implemented by the server 106 and selectively accessible, via network 108, by the browser.

The server 106 includes hardware, software, or both for providing the functionality of the server 106. The server 106 may include one or more servers. For example, the server 106 may include one or more application(s) servers, authentication servers, web servers, file servers, database servers or mail servers. In some embodiments, the server 106 is unitary. In some embodiments, the server 106 is distributed. The server 106 may span multiple locations. The server 106 may span multiple machines.

The server 106 may include a document management system application for managing and organizing electronic document data into electronic document projects and provide access to users thereof. In one example the document management system application executing on server 106 provides secure access to a set of electronic document data and allows users to acquire copies thereof for reproduction via a printer or image processing device. The document management system may include an indexing and search functionality to allow for a user to employ context-based searching for documents that meet particular criteria. The document management system application may create data structures in data store 107 coupled thereto for storing electronic document data as one or more projects. Another type of functionality provided by the document management system application executing on server 106 is creating and managing metadata associated with individual electronic document data objects and electronic document project data object. The document management system executing on server 106 may also provide an authentication function to allow users and/or image processing devices to provide access credentials in order to gain access thereto. These components of the server 106 reside in the server 106 in any suitable manner. For example, these components may reside on one or multiple servers. In some embodiments, one or both of these components may be provided as part(s) of a software application. In some embodiments, one or both of these components may be provided as a stand-alone software application.

The network 108 couples the one or more servers 106 and one or more image processing devices 101. The network 108 may be any suitable network. For example, one or more portions of the network 108 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 108 may include one or more networks.

It should be understood that the architecture and systems describe hereinabove with respect to FIG. 1 are merely representative and should not be construed as limiting. The architecture in which the present invention is operative may include any number of image processing devices, computing systems and/or servers. Moreover, the functionality described above is described to facilitate the understanding of invention principles and one or more of the component systems described individually may be combined with any of the other components described therein.

Figure 2:
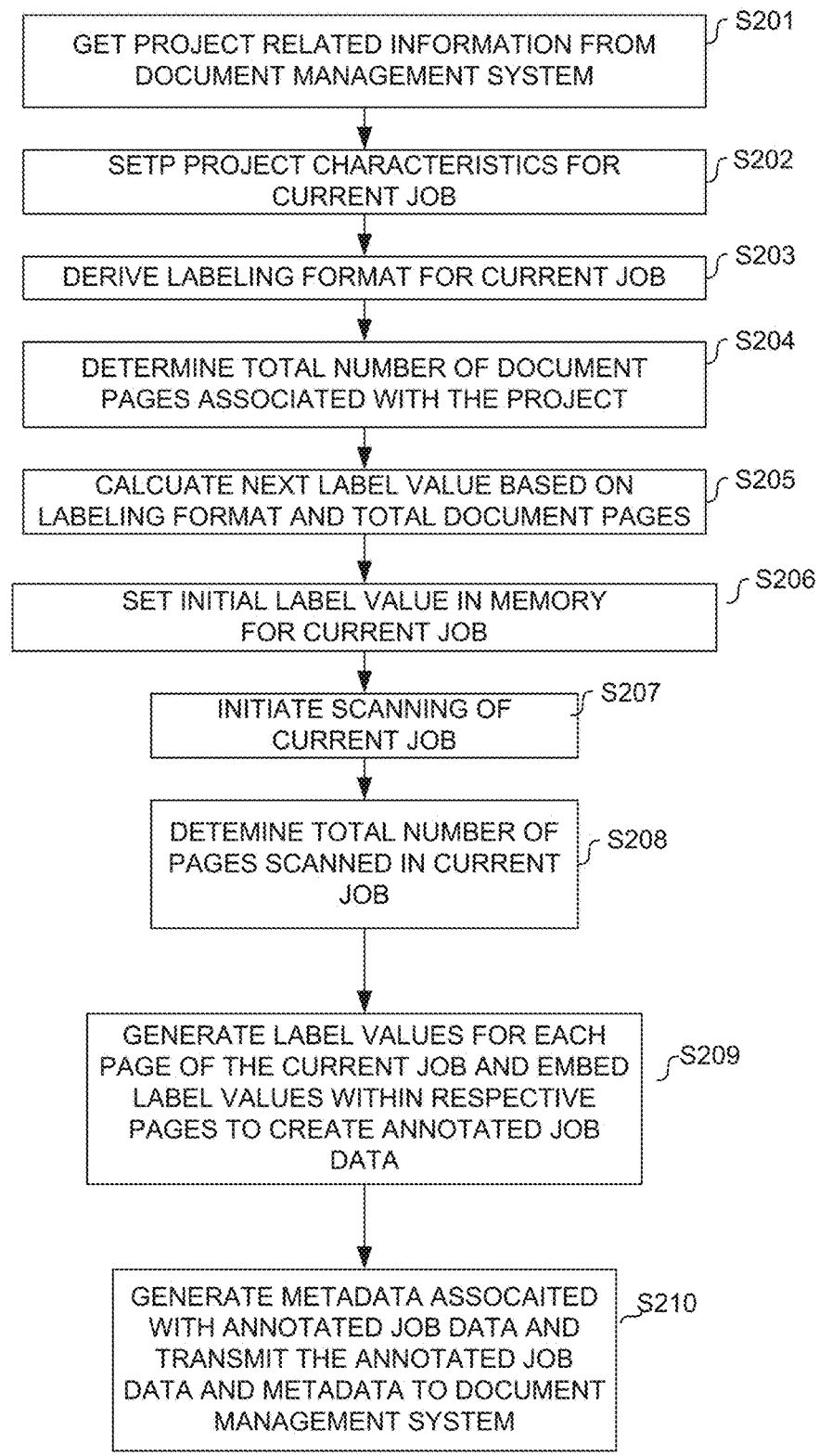
FIG. 2 illustrates an exemplary operational flow of an application at an image processing device according to invention principles.

FIG. 2 is described with reference to the example network environment 100 of FIG. 1. FIG. 2 illustrates a representative algorithm defining the operational flow of the system according to invention principles. The operational flow described hereinbelow may be implemented by application 103 executing on the image processing device 101. In another embodiment, an application executing on server 106 may also implement the functionality described hereinafter. In each instance, execution of the application in the following manner advantageously improves the operation of the device by enabling data created by the machine using a first feature (e.g. scanning functionality) to be automatically modified to create a new data object that includes an identifier allowing it to seamlessly be integrated into a collection of electronic documents stored and organized on a remote system. A further advantage provided by the execution of application 103 relates to enabling an image processing device having resources that may be limited as compared to conventional server, to integrate with a remotely hosted management application that typically requires significantly more resources than is present in an image processing device. A further improvement to the operation of the image processing device 101 is to improve the reliability and accuracy of the information being modified when creating a new data object because the application 103 advantageously knows the context in which the new data object will be placed in the larger collection. The increased reliability and accuracy of the newly created data object improves the efficacy with which the newly created data object may be created and used by a destination system In one embodiment, the algorithm of FIG. 2 may be a program or set of programs embodied as application 103 in the image processing device 101. In this embodiment, one or more processors of the image processing device 101 initiates execution of the algorithm of FIG. 2. In certain instances, the steps described herein with respect to FIG. 2 represent various modules which may or may not include sub-routines or sub-algorithms specifically directed to provide certain application functionality and will be identified and will be discussed with respect to other Figures hereinafter.

Typically, application 103 may be executed one of automatically upon start-up of the image processing device 101 or in response to user selection of an image element displayed on the user interface 102 of the image processing device 101. Application 103 may be a scan annotation application that interacts with the scan processing routine conventionally known to be included in the image processing device 101 to create a new data object that will be transmitted to and used by a remote system such as a document management system. The annotation functionality provided by application 103 advantageously enables conversion hard copy documents into electronic document data objects which may then be sequentially labeled so that each page of the electronic document data can be identified and the entire electronic document data may be stored in a document management system that indexes a plurality of electronic documents for later access by one or more users.

Thus, the following description of the steps and features implemented by application 103 will be described in terms of a single instance of converting and labeling hard copy document, hereinafter a "current job" for inclusion into a single electronic document project. However, this is merely to facilitate the understanding of all features of according to invention principles. It will be readily apparent to persons skilled in the art that this application 103 and its functionality may be deployed across a fleet of image processing devices 101 and be able to communicate with one or more document management systems hosted on one or more servers 106.

Upon initiation of application 103 by the one or more processors of the image processing device 101, the application 103 may acquire project related data from at least one document management system executing on the one or more servers 106. The project related data object may be an electronic data file in a predetermined file format and structured in such a way to identify predetermined amount and type of information to the application 103 for use thereby. In one example, the project related data object may be an eXtensible markup language (XML) file that is structured in a known manner to identify one or more project-specific characteristics.

The project related data object includes at least a document identifier representing a last electronic document page number of a total number of electronic document page numbers in a particular project. The document identifier represents an electronic document data page within the project having the latest unique values in a series of unique values for the project. In one embodiment, the document identifier information may be a numerical value such as "100" which indicates that there are already 100 previously stored and uniquely labeled electronic document data pages in the particular project. In another embodiment, the document identifier information may be an alphabetical value such as "J" meaning that there are electronic document data pages labeled A-I stored in the particular electronic document project. In this instance, where the document identifier is alphabetical, once the number of total documents stored in the electronic document project exceed 26 (e.g. A-Z label values), the document identifier may continue by adding a second alphabetical character (e.g. AA representing the 27$^{th}$ document page) and incrementing future documents accordingly. In other embodiments, the document identifier may be an alphanumerical label such as "A25". This may allow a first portion of the document identifier, e.g. "A", to relate identify a particular electronic document in the collection of electronic documents and a second portion, e.g. "25", to identify a final page of the particular electronic document. Here, this value may indicate that electronic document A has 25 total electronic document pages.

This document identifier is used as an input by application 103 in order to generate a set of subsequent document identifier values for each electronic document page of a current job. For example, if the document identifier value received is "100", application 103 may include a numerical incrementing module to generate job-specific document identifiers for the first page of the current job. In this example, a first job-specific document identifier for a first electronic document page is set equal to "101" and each subsequent page of the electronic document of the current job is incremented by a value of "1". This process for generating document identifiers will be discussed hereinafter with respect to FIG. 6.

In certain embodiments, the newly generated job-specific document identifiers based on the received document identifier in the project specific data object are used by application 103 to generate label value data. The label value data is a value that is unique to each respective electronic document page in both the current job and all other electronic document data contained in the project with which the current job is associated. The label value data may include document identifiers alone or in combination with other data values that are associated with one of the current job and/or the electronic document project in which the current job will be included.

In certain embodiments, the project related data object received from the document management server may include other project-specific characteristics. These project-specific characteristics may be used by the application 103 in generating the label value data. In one example, at least one type of project specific data may be combined with the respective document identifiers to generate unique label value data which is embedded into each electronic document page. The project specific characteristics may also be used by the application 103 for generating a graphical user interface for presentation to a user via user interface 102. In certain embodiments, the project specific data may include prepopulated values that are automatically displayed with a GUI used to initiate the current job. In other embodiments, the project specific data may include job-specific data fields that have no data values but which used by the application to generate the GUI and request data input from a user. The values for these data fields may be one of user-fillable or automatically populated using session information. For example, a job-specific data field may be "author" and the acceptable data value is a value corresponding to the user who is initiating the current job. The user value may be selectively input via the display screen of the user interface 102. Alternatively, the user value input into the author field may be automatically populated by the application 103 which uses session information derived from a user accessing one or more resources of the image processing device 101. For example, if a user accesses a device via a smart card, the device automatically knows the user associated with the card and this information may be automatically populated into the job-specific data field. This is merely one example of type of job-specific data fields and any type of data field that enables a user to enter a data value may be included in the project-specific data to further define information associated with the current job and/or electronic document project.

Other examples of job-specific data either included in the project-specific data object or which may be elicited from a user via a GUI includes one or more of (a) a matter identifier that identifies the matter that the electronic document or project is associated; (b) client identifier identifying a client that the electronic document or project is associated; (c) an author who has created the electronic document or project; and (d) a type of document. These job/project specific characteristics are described for purposes of example only any type of description information associated with one or more electronic documents of an electronic document project may be included in the project specific data object received by application 103.

In a further embodiment, the project-specific data object also includes format data identifying a format for the label value data being generated by application 103. to be applied to or otherwise embedded within respective electronic document pages of an electronic document. In certain embodiments, job specific information and/or project specific information may be included in the format data. Format data may also be contained in a separate format data object that is one of acquired by application 103 from the document management system. Alternatively, the format data may be a separate data object stored in a memory of the image processing device 101 and accessible by application 103. The format data includes a template string that identifies the types of information to be concatenated with the unique document identifier. For example, the format data may be as follows: <matter>_<client>_<DocID>

In this exemplary format data, the label value data embedded on each document page includes a first project characteristic (e.g. matter), a second project characteristic (e.g. client) and the document identifier. While this example illustrates two project-specific characteristics, this is shown for purpose of example only and the format data may identify any number of project characteristics or job-specific characteristics in conjunction with the unique document identifier. Alternatively, the format data may include no project or job-specific characteristics and instead may only include the unique document identifier.

Examples of various types of project-specific data objects are illustrated in FIGS. 8A-8C. The data object in FIG. 8A-8C are represented here as XML files. However, this is for purposes of example only any file type able to set forth a set of information and which is easily parsible by a parsing application may be used. A first exemplary project specific data object 800A is illustrated in FIG. 8A. The project specific information is contained with project identification tag 805 which indicates that the project to which this data is related is entitled "X". Object 800A includes format tags 810 which identify the format data describing the format of the label value to be generated by application 103. The format tags 810 includes a format structure tag 812 which sets the label value format as including a first project characteristic (ProjChar) with a separator (e.g. an underscore) and the document identifier value (DocID). The format data tags also include a ProjChar tag 814 that sets the value for the project characteristic to be included in the label value. As shown herein, the value for the project characteristic is set equal to "Matter" which results in the label value data including a matter identifier and the document identifier. Data object 800A also includes a Begin Next Document tag 820 that indicates that the value set in this tag represents the first document identifier for the first electronic document page of the current job and is used by application 103 when generating the label value. This value is specified in a DocID start tag 822 which indicates that the last electronic document page in Project X is "0015" and that application 103 should increment the document identifier by 1 when generating the document identifier for the first electronic document page of the current job. Alternatively, the value in tag 822 may represent the document identifier value to be applied to and embedded within the first electronic document page of the current job.

FIG. 8B illustrates a second exemplary type of project specific data object 800B. This embodiment includes certain similar tags and data values as those described in FIG. 8A and the description of which is incorporated herein by reference and need not be repeated. Object 800B includes the format tag 810 and structure tag 812 and variable definition tag 814 as discussed with respect to FIG. 8A. Object 800B also includes a document characteristic tag 825 that specifies project specific data fields representing project characteristics. The document characteristic tag 825 may include any of (a) a first characteristic (Char1) 826 having the data field value of "matter" identifying the matter with which Project X is associated; (b) a second characteristic (Char2) 827 having the data field value of "client" identifying a name of a client with which Project X is associated; (c) a third characteristic (Char3) 828 identifying an author that creates the electronic document; and (d) a fourth characteristic (Char4) 829 identifying a type file that embodies the electronic document. The values in tags 826-829 may be used by application 103 in generating a GUI to be presented to the user when initiating the current job. In certain embodiments, each of tags 826-829 may include further sub-tags defining data values that can be read by application 103 and prepopulated in fields within the GUI generated by application 103. Additionally, application 103 may also use any such data values, whether contained in data object 800B or input by a user via a GUI generated by application 103, as the characteristic value specified in the format tag 810. In this example, the format tag 810 indicates that the label value format includes the first characteristic of "matter" and, if a value for matter is specified under the first characteristic tag 826, then application 103 use that data value when generating the label value to be embedded into each electronic document page of the current job. Also included in object 800B are document tags 831, 834 and 837 representing the first through third documents, respectively, that currently make up the electronic project data Project X. Contained within each document tag 831, 834 and 837 include document start tags identifying the document identifier embedded in the first electronic document page of that respective document and document end tags identifying the document identifier on the final page of the particular electronic document. Thus, the first document identified in tag 831 includes a document start tag 832 identifying the first electronic document page with the numerical value of "0001" and a document end tag 833 indicating the final document identifier on the final page of the first electronic document with the numerical value of "0004". The second electronic document 834 has document start tag 835 and an end tag 836 both with the same value "0005" indicating that the second electronic document includes only a single page. The third document identified in tag 837 includes a document start tag 838 identifying the first electronic document page with the numerical value of "0006" and a document end tag 839 indicating the final document identifier on the final page of the third electronic document with the numerical value of "0010". In this example, the application 103 parses object 800B to identify the characteristic to be included in the GUI and identify the format data used to generate the label value. Application 103 may also parse the document tags to identify each of the documents contained within the project and will use the DocID end value of the last document in the project in order to determine what document identifier should be applied to the first electronic document page of the current job. In this example, application 103 would identify that document 3 is final document and that document three ends with document identifier "0010" as shown in tag 839 and automatically increment the document identifier value in tag 839 by 1 to generate the next document identifier for the current project.

FIG. 8C illustrates a third type of project specific data object 800C. Data object 800C includes all of the same tags described in FIG. 8B but in a different format. In this object, each document tag 831, 834 and 837, also each include an electronic document characteristic section 825 having data value tags 826-829 identifying project specific data values that may be used by application 103 to be prepopulated into the GUI generated and also used as values to be included in the label value generated by application 103 and embedded in the electronic document pages of the current job. With the structure illustrated in object 800C, application 103 would be able to identify and determine the document identifier to be used for the first electronic document page of the current job in the same manner as described above in FIG. 8B.

Data objects 800A-800C are illustrated for purposes of example only. It should also be understood that while the various types of information acquired by application 103 from the document management may also be done via various message and response calls where the application 103 requests, from the document management system a particular type of information, and the requested type of information may be provided in a return message to application 103.

Returning back to FIG. 2, upon completion of step S201, application 103 uses the data contained in the project specific data object to set the project characteristics for the current job. In one instance, application identifies project characteristic data values such as "matter" name and "client" name and stores those data in memory. Once stored in memory, various routines of application 103 are free to access those memory objects for specific uses. In one example, the application uses the characteristic data value received from the document management system to generate a GUI that is presented to a user on the user interface 102 of the image processing device. The characteristic data values may be used as fields that are one of prepopulated with project specific data received from the document management system and user-fillable enabling a user to directly input a data value for the particular data field. This GUI may also provide one or more user selectable image elements enabling the user to initiate the scan and annotation current job as will be discussed later. Additionally, as will be discussed hereinafter, the characteristic data objects may remain in memory and selectively used by application 103 when generating the label values to be applied to each document page of the current job.

In step S203, application further parses the project specific data object to identify format data contained therein. The format data defines the type of information data values that will be combined together into a single label value string and which will be applied to and embedded within each electronic document page of the current job. In other embodiments, should the project specific data object not include format data information, application 103 may access predetermined format data object stored in one of the RAM or ROM of the image processing device. In this instance, the format data object may be preconfigured as a default format and provide the application with the types of data values to be combined together into a label value string. In a further embodiment, application 103 upon determining that the project specific data object does not include format data information, application 103 may generate a further GUI including at least one of (a) a set of job specific characteristics; (b) project specific characteristics; and (c) user-definable data fields enabling a user to enter, free-form, data values to be included in the label value string. In this instance, a user may select one or more characteristic data values in a particular order, for example, by selecting check boxes displayed within a GUI. The resulting selection may be presented to the user, in real-time, showing the user the resulting label value format that has been selected and will ultimately become the format data object that will be stored in memory and used by application 103 when generating label value data for each electronic document page. In all instances, the format data object includes the document identifier so that each electronic document page will include at least one unique data value able to identify its place within a compilation of electronic documents in an electronic document project.

In step S204, application 103 parses the project specific data object to identify a total number of pages associated with the particular electronic document project. In the embodiment, where the data object acquired by application 103 is the data object 800A of FIG. 8A, the application 103 may use an XML parser to locate an XML tag indicative of total page information. In this instance the tag in object 800A is titled "Begin Next Doc" and includes the value for the next document identifier in the series to be equal to "0015". Application 103 would store this in memory for later use by the label value generation routine. It should be noted that the name of the tag discussed here and illustrated in FIG. 8A is merely exemplary and named to facilitate a simple understanding of the purpose thereof. Any and all tag names illustrated in FIG. 8A may be named differently and the application 103 may be coded to look for any named tag that includes document identifier (DocID) values.

In the embodiment where the data object 800B is acquired by application 103 from the document management system, application 103 may use an XML parser to identify document tags identifying a final document contained in the project. In this instance, the tag for "Doc3" represents the last document. Application 103 will further parse the "Doc3" tag to identify a value representing the final page in that document. Here, object 800B indicates that final electronic document page of "Doc3" has a document identifier (DocID) value of "0010". This data value may be loaded into memory for later use by application when generating label value data. Application 103 processes the data object 800C shown in FIG. 8C in a similar manner as object 800B and need not be further discussed.

Upon determining the total number of electronic document pages in an electronic document in step S204, application 103 calculates a next document identifier that will be applied to the first electronic document page of the current job in step S205. This may occur by application 103 accessing the total page number data value determined in step S204 which is stored in memory and incrementing the data value by a predetermined integer, (e.g. 1). This calculated value represents the initial document identifier value for the current job and is stored in memory of the image processing device for later use thereto in step S206.

Steps S201-S206 may be referred to as the pre-processing steps or routines performed by application 103. Once the pre-processing steps have been completed, a scan job, representing the current job, may be initiated in step S207. Initiation of the current job in S207 may be performed by a scanning unit of the image processing device 101 which allows for a hard copy document having one or more physical pages to be digitized into an electronic document having one or more physical pages. In certain instances, the number of physical pages of the hard copy document is equal to the number of electronic document pages. In other embodiments, the transformation into electronic document data may result in the electronic document having double the number of pages because the original hard copy document may have physical data printed on both sides of a physical sheet of paper. Further embodiments may result in a number of electronic document pages being a number between the number of physical pages and double the number of physical pages. Also, the number of electronic document pages of the current job may be equal to half the number of physical pages if a scan job option causing multiple physical pages to be represented on a single electronic document page.

Step S208 occurs when the scanning, initiated in step S207, of the current job is completed. Once the hard copy documents have been digitized, a current job data object including all electronic document pages has been created and stored in memory of the image processing device 101. In one embodiment the current job data object is stored in persistent memory which allows for the current job data object to accessible to the application 103. In another embodiment, the current job data object may be stored in a non-volatile memory of the image processing device 101. In further embodiments, copies of the current job data object may be stored in both persistent memory and non-volatile memory. In step S208, application 103 accesses the current job data object to identify and determine a total number of electronic document pages contained in the current job data object and store a value corresponding to the total number of current job pages in memory.

In step S209, application 103 executes the label value generation routine. In this routine, application 103 accesses the format data for use as a label value generation template and accesses the total page number data object derived from the project specific information and used to produce the initial document identifier for the current job. For the first electronic document page of the current job, the label value generation routine accesses any characteristic data from memory based on information specified in the format data and concatenates the corresponding characteristic data with the initial document identifier to generate a label value data string which is then embedded into a predetermined region on the first electronic document page. Thereafter, the routine determines if the current job contains one or more additional electronic document pages and repeats this process but increments the initial document identifier value by a predetermined number (e.g. 1), stores the updated document identifier in memory, and concatenates the characteristic data with the updated document identifier based on the format data to generate a subsequent label value string which is then embedded into a next electronic document page of the current job. This repeats until there are no further electronic document pages in the current job. At that point, application 103 creates an annotated job data object including all labeled and annotated electronic document pages.

In step S210, application generates a metadata file including job-specific information associated with the annotated job object and transmits both the metadata file and the annotated job object via network 108 for receipt by the document management system for storage in the electronic document project. The metadata file may contain characteristic data that is usable by the document management system to ensure that the annotated job data associated therewith is stored in the correct project. The metadata file may also contain additional data values input via the GUI during the pre-processing steps that can be used by the document management system. For example, if the "author" data field was completed prior to initiation of the job, the data value entered into the author data field can be included in the metadata file and communicated back to the document management system. At the completion of step S210, the application 103 is reset and awaits further instructions from a user for any subsequent jobs.

FIGS. 3 and 4A-B illustrates certain of the steps described above in FIG. 2. Turning first to FIGS. 4A and 4B, application 103 may generate a GUI 400A including a plurality of user selectable image elements 402, 404, 406 each corresponding to a predetermined number of electronic document projects managed by one or more document management systems. The image elements 402-406 may be shortcuts that are selectable by a user and allow for the image processing device to communicate with and access a respective document management system. Each image element may have, access information associated therewith comprising an address of the server 106 or other computing system where the respective document management system is stored. Access information may also include access credentials (e.g. user name, password, token or the like) enabling the image processing device 101 to access the particular document management system to obtain information about the particular project. In another embodiment, as shown in FIG. 4B, application 103 may generate GUI 400B that includes a first user fillable field 410 enabling a user to identify a name of particular project to which the current job is to be associated. A second user fillable field 412 enabling a user to identify an address location at which the project identified in field 410 is located. The address may be of a server on a local area network or an address of a server accessible via a wide area network such as a website or internet protocol address. While the fields in FIG. 4B are user fillable, they may be filled via free-form text entry or selection from a drop down menu of candidate selections. The values selected or input in FIG. 4A or 4B may occur during step S201 of FIG. 2 to allow application 103 to acquire project specific data from the document management server.

Turning now to FIG. 3, which further illustrates certain of the steps of FIG. 2, steps S202-S204 are represented by the GUI 301 that is generated by application 103. GUI 301 is output by the user interface 102 of the image processing device and includes a plurality of data fields identifying either job specific data and/or project specific data. In response to the activities of S202 in FIG. 2, the characteristic data derived from the project specific data object is used in generating GUI 301. In this example, GUI 301 includes a matter field 302, a client field 303, an author field 304, a document type field 305 and a label value identifier field 306. In some instances the data values displayed in the field may be acquired from the document management system in accordance with the method described above. In other instances, the field may be blank to be completed by the user. It should be noted that label value identifier field 306 displays the format of the label value to be embedded in each electronic document page. In the example shown here, the format data instructed that the format for the label value should be "matter_DocID" because the value in field 306 shows "XXXX_004" and "XXXX" is a project characteristic shown in the matter field 302. Similarly, the document identifier "004" shown in field 306 may represent the calculated initial document identifier for the current job as determined in accordance with steps S204-S206. Further, an initiation image element 307 may be included that allows a user to actively initiate the scan, conversion and annotation job.

At the completion of the current job, an annotated job data object 310 and a metadata object 320 are created as set forth in steps S207-S210 of FIG. 2 and transmitted to document management server 106 for inclusion into the respective electronic document project. As shown in FIG. 3, for the purposes of illustrating the operational principles of application 103, the annotated data object 310 is shown in an expanded manner. In this example, the annotated data object 310 includes a first electronic document page 311 and a second electronic document page 316. On each of pages 311 and 316, are label regions 312 and 316, respectively. The label regions are identified by the application in a manner that will be discussed hereinafter with respect to FIG. 5. The label values 314 and 317, respectively, are generated by application 103 for each of page 311 and 316 and embedded directly into the page so as to transform the data comprising the original page into an new type of data comprising an annotated page. As shown herein the first label value 314 on the first page 311 includes the characteristic data of "matter" having a value of "XXXX" combined with the initial document identifier value of "004" which was shown in GUI 301. For the second page, application 103 automatically incremented the document identifier value by 1 to "005" and combined the updated incremented document identifier with the characteristic data "XXXX" to generate the label value for the second page 314. Additionally, application generates a metadata data object (e.g. metadata file) 320 in predetermined file format (e.g. XML) including information about the current job. Details as to how this object is generated and the data included therein will be discussed hereinafter with respect to FIG. 7.

Figure 5:
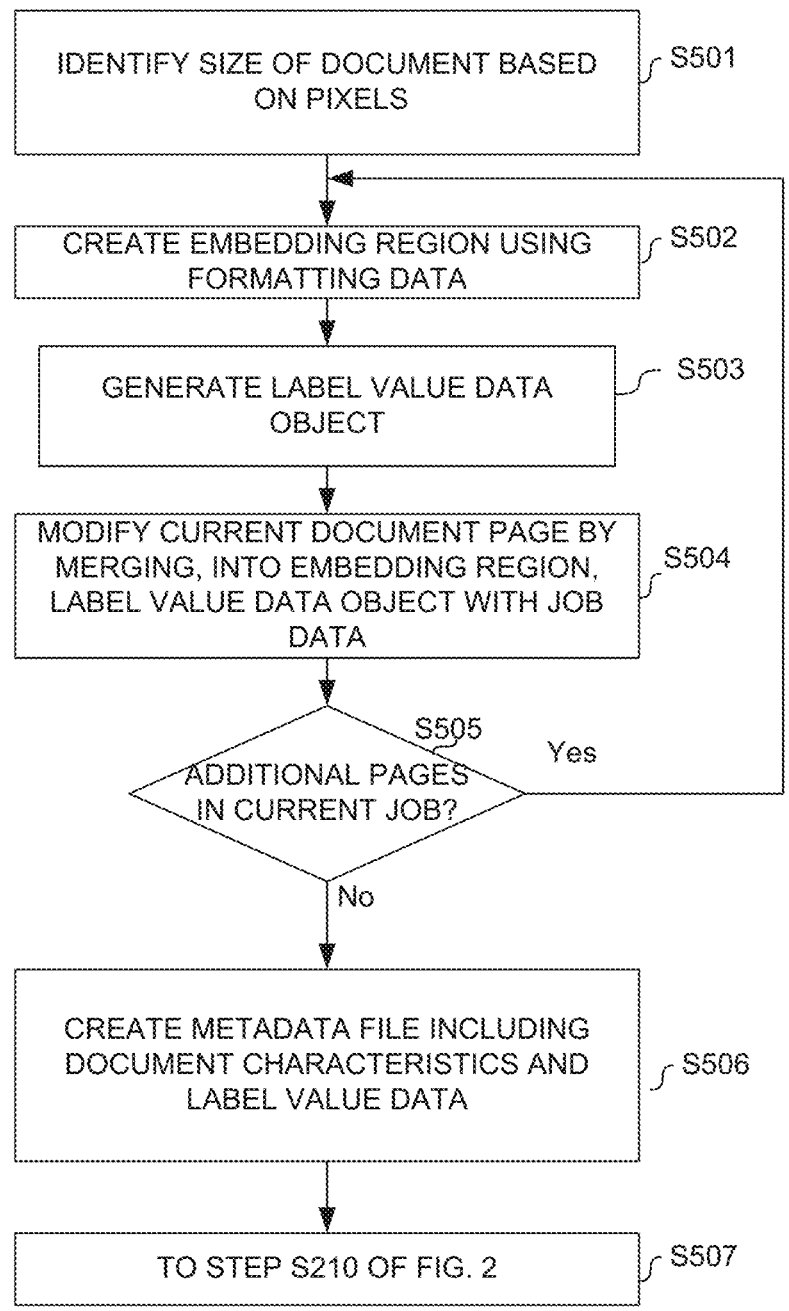
FIG. 5 illustrates an exemplary operational flow of an application at an image processing device according to invention principles.

FIG. 5 is a flow diagram detailing an exemplary manner in which step S209 in FIG. 2 may be performed. FIG. 5 occurs after creation of the current job data object in which case the application 103 accesses the current job data object and parses the data to identify, within the data object, the location of each document page so that the application 103 may perform the steps of FIG. 5 on each document page within the current job data object. The processing of FIG. 5 begins at the first electronic document page.

Initially, in step S501, application 103 determines or identifies a size of the document pages that are included in the current job data object. This may occur by conducting a pixel mapping of the data to identify the size of the document. Exemplary document sizes may include any convention paper size such as letter, legal, A4, A5, etc. Any paper size may be determined and is only limited by the physical capacity of the image processing device 101 in terms of the size of the physical document that may be scanned and converted. In one embodiment, the document size determination is made only using the initial first electronic document page.

In step 502, application 103 modifies the data of the first electronic document page by creating an embedding region at a predetermined position on the first electronic document page. The creation of the embedding region is performed using a set of format data that defines the position at which the label value data should be embedded on each page. In one embodiment, the format data defining the size, shape and position of the embedding region may be derived from the format data object acquired by application in step S201 in FIG. 2. In another embodiment, the format data defining the size, shape and position of the embedding region may be preconfigured upon setup and installation of application 103 on image processing device 101. In further embodiments, the format data used by application 103 for any purpose may be generated using format data acquired from the document management system 106 and preconfigured format data included within application 103. An illustration of step S502 is shown in regions 312 and 316 in FIG. 3. Therein, step S502 indicated that embedding region is created at a predetermined height from a bottom edge of the electronic document and a predetermined distance away from a right edge of the electronic document.

In a further embodiment, the creation of the embedding region 502 occurs using the structure of the label value included in the format data such that the application analyzes the types of data that needs to be included in the label value and determines an amount of pixels (both height and width) required to ensure that the label value can be unobtrusively embedded within the electronic document page and defines the boundaries of the embedding region based on the determined amount of pixels.

Once the embedding region has been created, application 103 generates label value data in step S503 which will be embedded into the embedding region created in step S502. Step S503 is performed using the format data as discussed above and will further be described in FIG. 6. Once the label value data for the first electronic data page is generated, application 103 modifies the current job data object by merging the label value data into the embedding region as in step S504. In one embodiment, the process by which label value data is embedded into the embedding region occurs by application generating image data representative of the label value data and inserting the image data file into the data that forms the electronic document page. In another embodiment, the process by which label value data is embedded into the embedding region occurs by application 103 controlling a secondary labeling application and causes the labeling application to generate text data representative of the label value data within the embedding region. These are merely two exemplary ways that the label value data may be embedded into the embedding region and should not be construed as limiting.

At the completion of step S504, in one embodiment, the merged electronic page data is stored as a new annotated data object in memory. In other embodiment, the current job data object is partially modified directly with no new object creation occurring. Application 103, in step S505 determines whether any additional document pages are included in the current job data object. If the result of the query in S505 is positive ("YES" in S505), application repeats steps S502-S505 until the result of the query in S505 is negative ("NO" in s505) at which point the annotated data object is completed. Once the query in S505 is negative, application 103, in step S506 also creates metadata file to be associated with the annotated data object. Further description as to the metadata creation process will be discussed hereinafter with respect to FIG. 7. Thereafter, in step S507, application 103 performs step S210 in FIG. 2.

Figure 6:
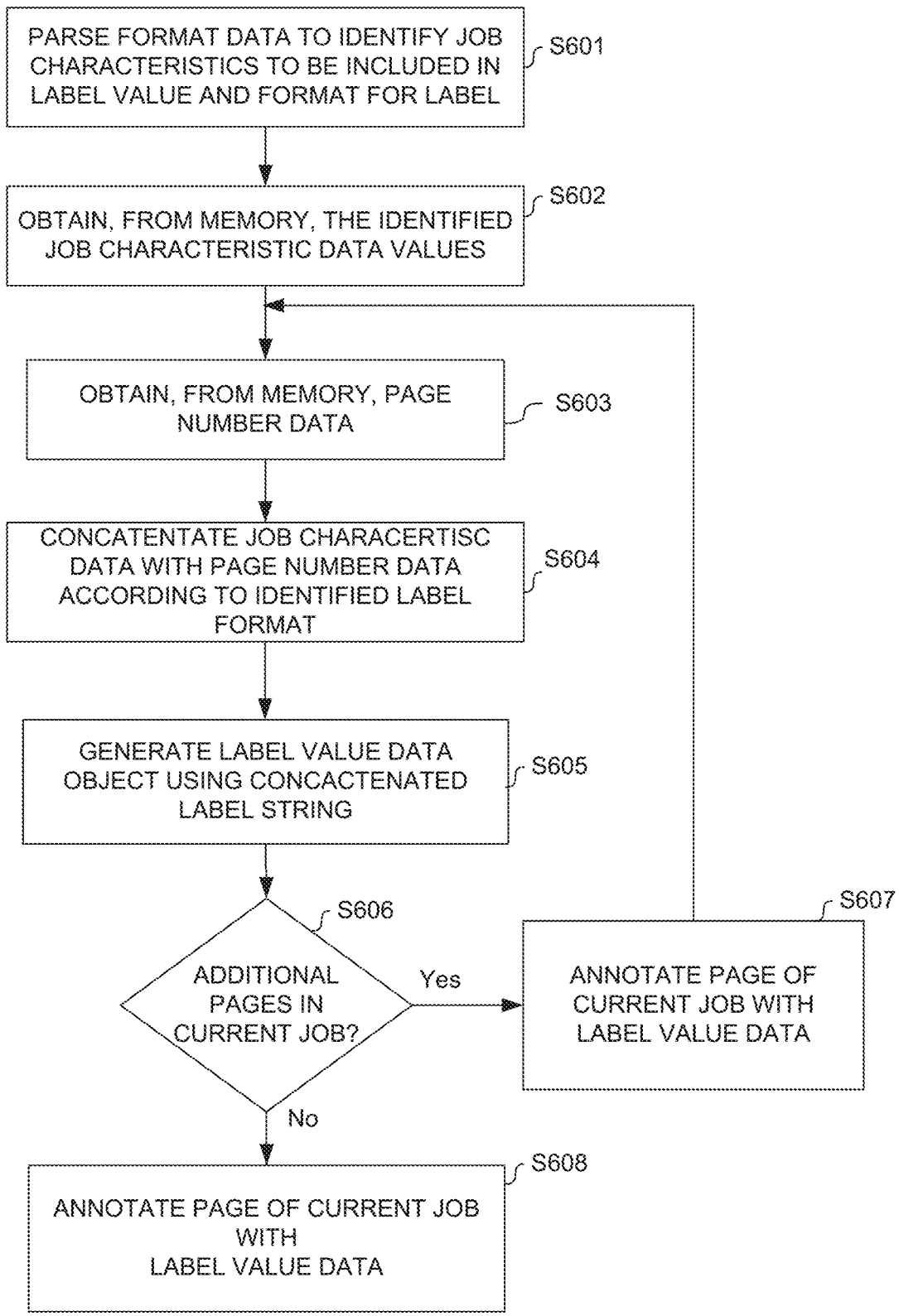
FIG. 6 illustrates an exemplary operational flow of an application at an image processing device according to invention principles.

FIG. 6 is a flow diagram detailing an exemplary operational flow of the label value generation routine shown in step S503 of FIG. 5 (and S209 of FIG. 2). In step S601, application 103 parses the format data object to identify format data and which job characteristic data values are to be included in the label value being generated. An exemplary manner in which this may occur is described hereinabove with respect to steps S202 and S203 of FIG. 2 and need not be further repeated. In step S602, the application 103 obtains, from memory, the data values corresponding to the job characteristics identified in step S601. Using FIG. 3 as an illustrative example, the format for the label value is defined as: "matter_DocID". The value for the characteristic "matter", as shown in field 302 of GUI 301 is "XXXX". This value may have been derived from a format data object received from the document management system 106 or a value entered by a user directly via GUI 103. In either case, the value is stored in memory as "matter=XXXX". Application 103 accesses memory and pulls the value XXXX for inclusion into the label value as will be discussed hereinafter. The inclusion of a single characteristic as part of the label value is merely exemplary and provided to facilitate understanding of invention principles. Persons skilled in the art will understand that the label value may be formed from any number of characteristic data along with the unique document identifier.

Additionally, in step S603, application 103 access page number data stored in memory. The page number data corresponds to the initial document identifier value which represents the document identifier value to be included in the label value for the first electronic document page. This value was calculated in step S205 and stored in memory and is accessed is step S603.

In step S604, application 103 concatenates the characteristic data with the page number data in a predetermined manner to include at least one type of separator therebetween and a label value data object (314 in FIG. 3) is generated in step S605. In this example and as shown in FIG. 3, the results of steps S604 and S605 results in a label value data object having a string "XXXX_004". In step S606, application 103 queries whether the current job data object includes additional document pages. If the result of the query in S606 is positive ("YES" in S606), application 103 embeds, in step S607, the label value data object directly into the embedding region of the first electronic document page 311 to produce a modified annotated first electronic document page. Thereafter, application reverts back to step S603, to identify the next document identifier to be included in the next label value object for the next document page (e.g. 314 of FIG. 3). In one embodiment, to determine the correct document identifier value for the next document page, application 103 marks that a first page has been modified and increments the page number data value stored in memory by 2 because the next page is the second page of the document. A similar process occurs for the third and any further document pages. In another embodiment, application 103 automatically updates the page number data stored in memory to reflect the immediately previous document identifier value such that, when application 103 retrieves the updated document identifier value, application 103 merely increments that value by the predetermined number (e.g. 1).

Upon repeating steps S603-S605 for the second document page (e.g. 314 in FIG. 3), application performs the query of S606 until a negative result ("NO" in S606). A negative result is indicative that the most recent annotated page is the final page of the electronic document in the current job and, as such, in step S608, the final page is annotated with the label value data generated in S605. Thereafter, application 103 returns to S504 in FIG. 5.

Figure 7:
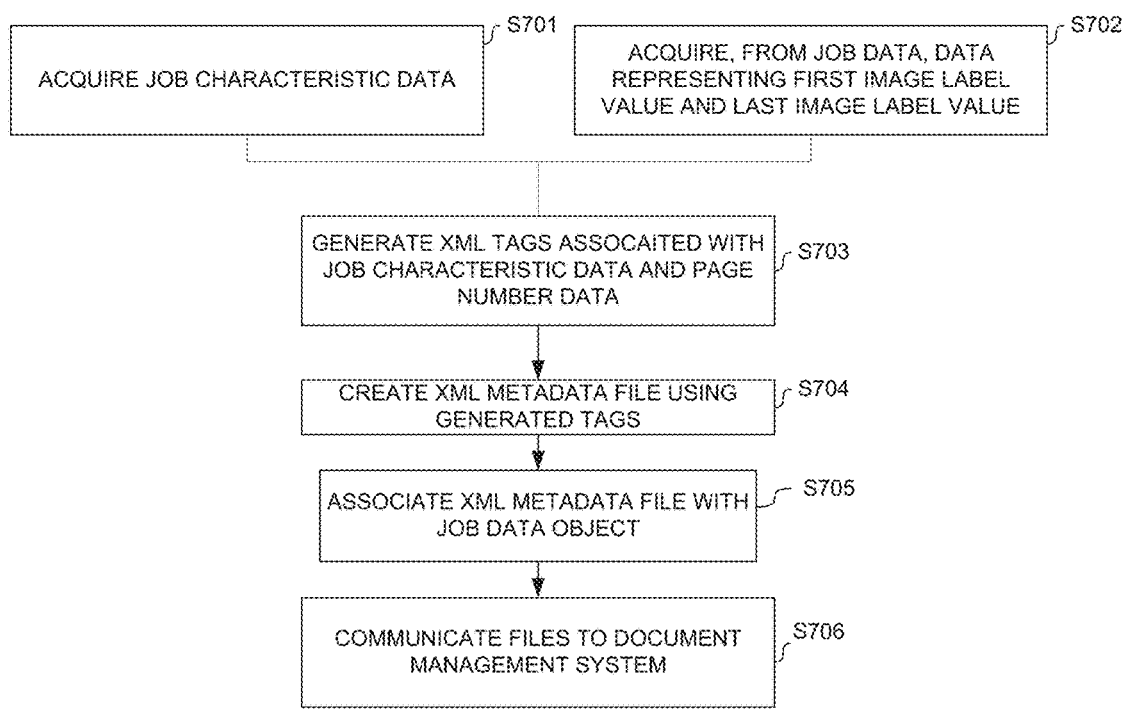
FIG. 7 illustrates an exemplary operational flow of an application at an image processing device according to invention principles.

FIG. 7 is a flow diagram illustrating an exemplary manner in which application 103 generates the metadata file that is associated with the annotated job data object created via the operational steps of FIGS. 5 and 6. In step S701, application 103 acquires job characteristic data values from their location in memory. These job characteristic values may have been imported when the format data object was acquired in step S201 in FIG. 1. Alternatively, the job characteristic values may be derived from data values input by the user via the GUI such as shown in FIG. 3. In step S702, the application 103 acquires job data representing the current job and including at least a document identifier included on a final document page of the job. Following the example shown in FIG. 3, step S702 would acquire the value "005" as the final document identifier value. In other embodiment, in step S702, application 103 may acquire the initial document identifier value embedded in the first document page of the electronic document. Steps S701 and S702 are shown as occurring concurrently with one another because there is no defined order in which these steps actually occur during application operation.

In step S703, application 103 uses the data acquired in steps S701 and S702 to generate XML tags identified the respective job characteristic fields and values associated therewith. Additionally, XML tags identifying page number information are also generated. While this step describes generating XML tags which presumes that the metadata file is an XML formatted data file, this is merely exemplary. It should be understood that the metadata file generated in accordance with FIG. 7 may be any file format that is able to delineate various data fields and corresponding data values therein. Other examples include text files (.txt files) or comma separated value files (.csv files).

Application 103 uses an XML generator in step S704 to generate the XML file using the tags generated in S703 and the generated file is associated, in step S705, with the annotated job data object that was generated in accordance with FIGS. 5 and 6. Thereafter, in step S706, application 103 communicates the annotated job data object and its associated metadata file to the document management system 106 via the communication network 108 in FIG. 1.

Turning now to FIGS. 9 and 10A-10D, the operational principles of the annotation application will now be described with respect to a sequence diagram detailing the various functions of application 103 (FIG. 9) and visual illustrations of the results of those functions (FIGS. 10A-10D).

Figure 9:
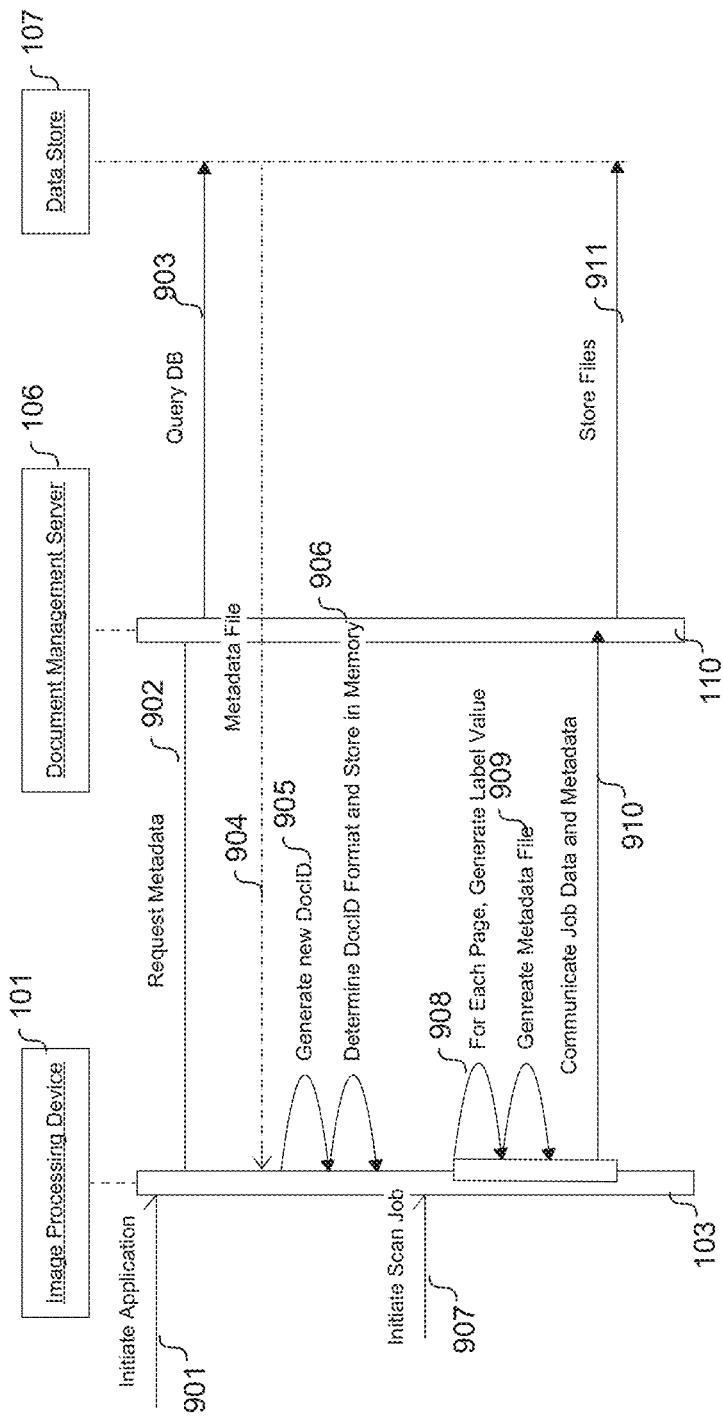
FIG. 9 is a sequence diagram illustrating exemplary functionality of an application according to invention principles.

FIG. 9 illustrates various systems and applications executing on each system with which application 103 on image processing device 101 interacts. Also shown is the document management system 106 that includes a management application 110 that selectively manages, stored, indexes and provides access to a plurality of electronic document projects that are stored within data store 107.

At 901 the annotation application 103 is initiated and, in response to user input, issues a request for project specific metadata at 902. The request for metadata is generated and communicated, via a communication network (e.g. internet, LAN, etc.), to the management application 110 executing on the document management server 106. The management application 110 may issue query 903 the database stored in data store 107. The nature of query may include data identifying an electronic document project stored in data store 107 and indexed by management application 110. Data matching the query terms is communicated at 904 back to application 103 executing on the image processing device 101. The data object communicated at 904 may represent the format data object as discussed above with respect to FIG. 2.

In response to receiving the format data object, application 103 generates a new document identifier to be embedded into the first electronic document page of the next initiated scan job at 905 and also uses the format data object to identify the label value format in which the document identifiers for all subsequent documents will be included at 906. The functions 902-906 correspond to the pre-processing functions (e.g. S201-S206) described above with respect to FIG. 2, the description of which is incorporated herein by reference.

At 907, in response to user command, the scan routine which captures images representative of hard copy document pages and digitizes them into a predetermined electronic data format is initiated. The result of the scan routine is a current job data object including one or more electronic document pages. At 908, for each document page within the current job data object, unique label value data are generated and embedded within the respective page to create an annotated job data object. The function performed at 908 corresponds to steps S209 in FIG. 2 as well as the entirety of FIGS. 5 and 6. These functions will be further illustrated in the following description of FIGS. 10A-10D.

Figure 10A:
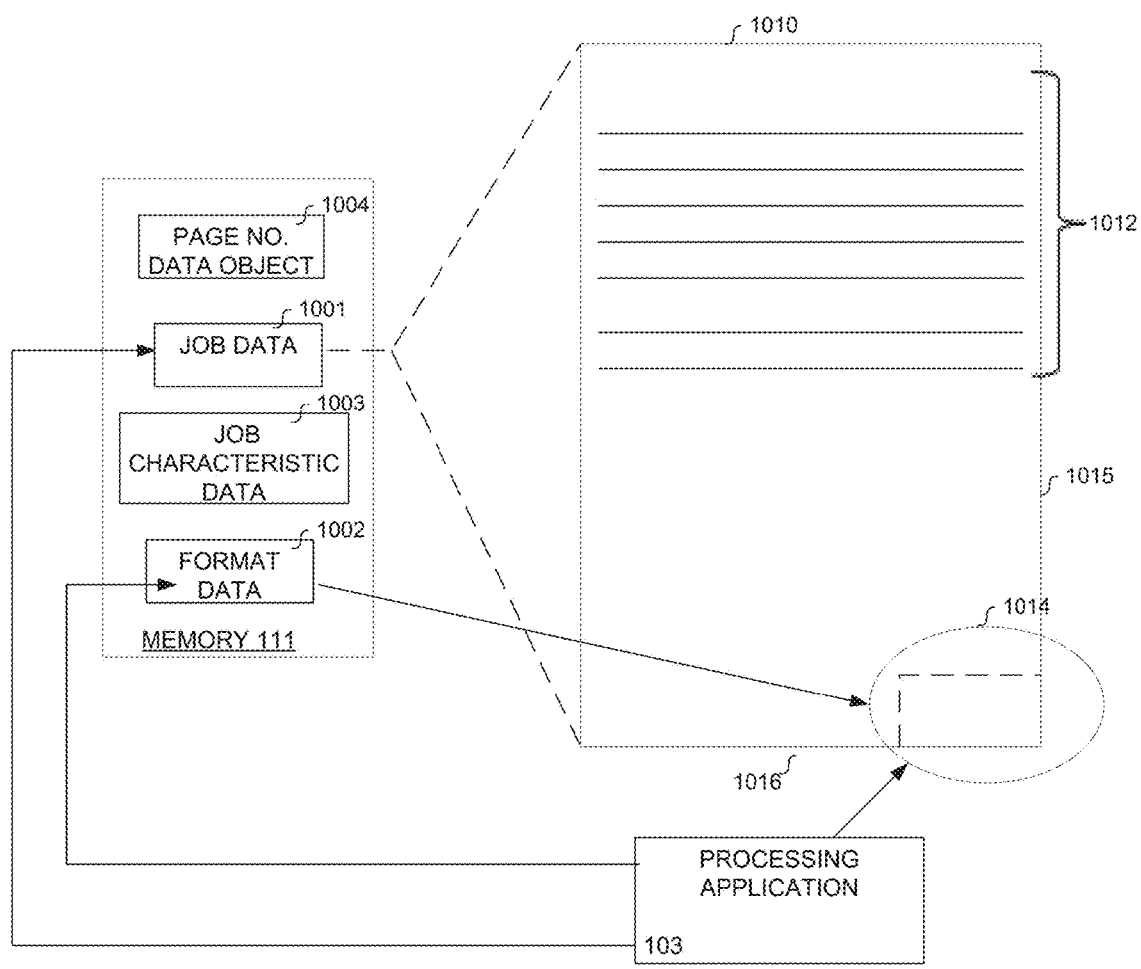
FIGS. 10A, 10B, 10C and 10D illustrate the functionality of an application at an image processing device according to invention principles.

In FIG. 10A, application 103 executes on the image processing device (101 in FIG. 1) and also interacts with various data objects stored in memory 111 of the image processing device. As shown herein, at 908 of FIG. 9, memory 111 includes at least one of (a) a current job data object 1001 generated by the scan routine initiated at 907 in FIG. 9; (b) format data object 1002 that was one of acquired from the document management system in 902-904 and/or preconfigured as part of application 103; (c) job characteristic data objects that were one of acquired from the document management system in 902-904 and/or acquired in response to user input via a GUI such as shown in FIG. 3; and (d) page number data object 1004 that includes a data value representing a document identifier that has been calculated to be the next sequential document identifier to follow the latest document identifier previously stored in the document management system. In FIG. 10A, application 103 accesses current job data object to identify the various electronic document pages that make up the electronic document generated by the current job. To illustrate that procedure and further illustrate how label value data is generated and embedded within respective document pages of an electronic document, only a first document page 1010 is shown. The first document page 1010 includes data items 1012 that represent the data printed on the physical hard copy documents that were digitized at 907 via the scan routine. The data items may be text or graphical or image data or any combination thereof. Upon accessing the first electronic document page in the current job data, processing application 103 further parses the format data object to identify the embedding region. In one example, the format data object 1002 may include position and size information defining the size of the embedding region to be created. For example, if the electronic document page is captured at a resolution of 300 pixels per inch (ppi) and the document is a letter size document, then width of the document page in pixels is substantially 2550 pixels and the height is substantially 1100 pixels. Thus, the format data may define the position information for the embedding region as a predetermined number of pixels from a right edge 1015 and a predetermined number of pixels from a bottom edge 1016 of the document page 1010. Thus, application 103 creates a region within the first electronic document page 1010 as the embedding region based on the position information of the format data object. The created embedding region is shown in the circle labeled 1014. The activities illustrated in FIG. 10 may also correspond to steps S501 and S502 in FIG. 5

Figure 10B:
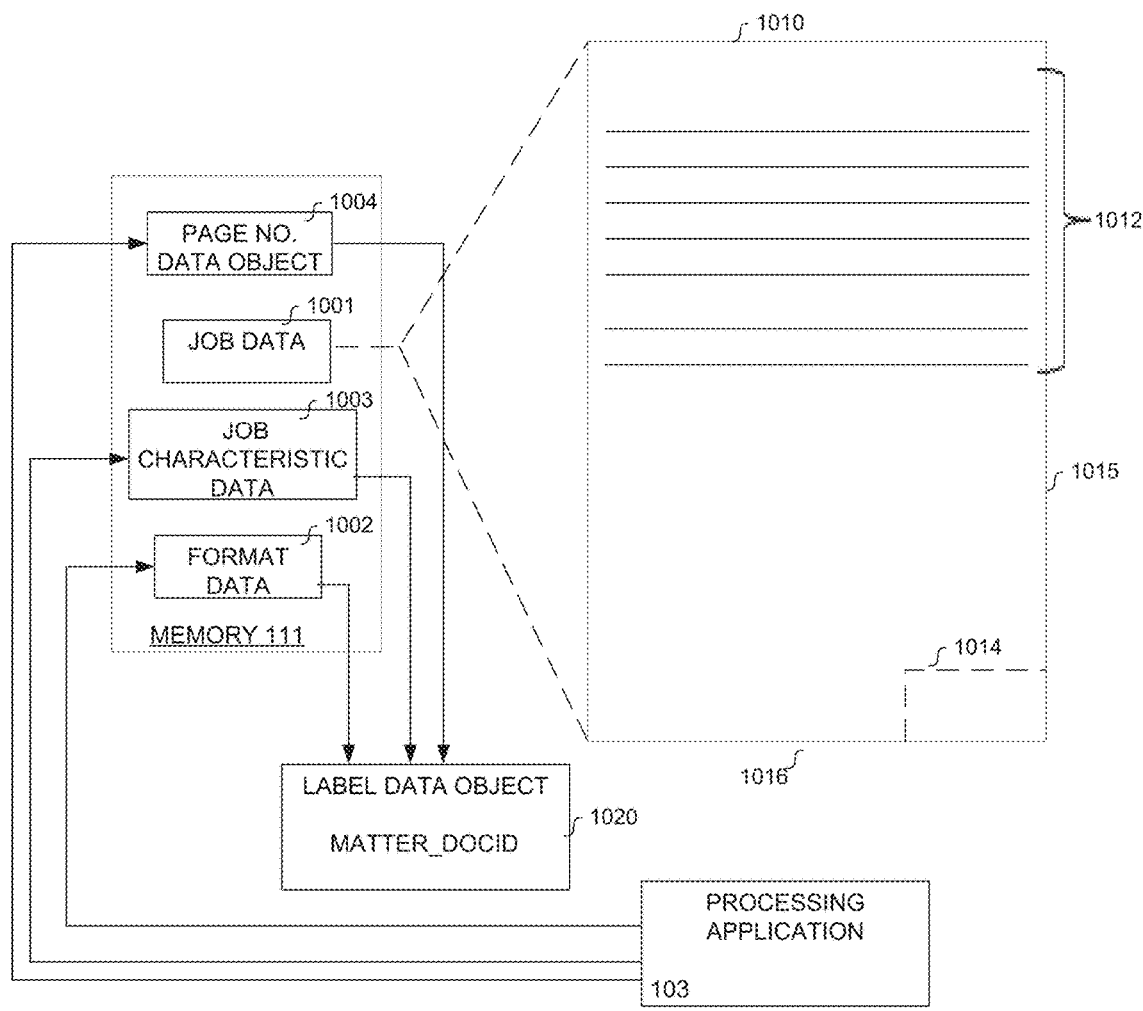

The function of generating label value data and embedding the generated data represented by 908 in FIG. 9 continues in FIG. 10B. Application 103 access the format data object 1002 to derive a label format for the label value data object 1020 to be generated. In this instance, the format data object defines the structure of the label value as "matter_DocID" indicating that the label value will include the matter name (or other identifier such as matter number) and the document identifier representing the initial document identifier value based on the final document identifier value received from the document management system. Application 103 also accesses the job characteristic data object 1003 to identify the value or values of the job characteristics that are to be included in the label value data object based on the information derived from the format data object 1002. In this instance, the job characteristic to be included in the label value data object is the characteristic of "matter" identifier. Application 103 access the job characteristic data object to look for the value corresponding to "matter". Application 103 accesses the page number data object to derive the document identifier to be associated with the first document page of the current job. This value will be included in the label data object being generated for embedding into the embedding region 1014 of the first document page 1010.

Figure 10C:
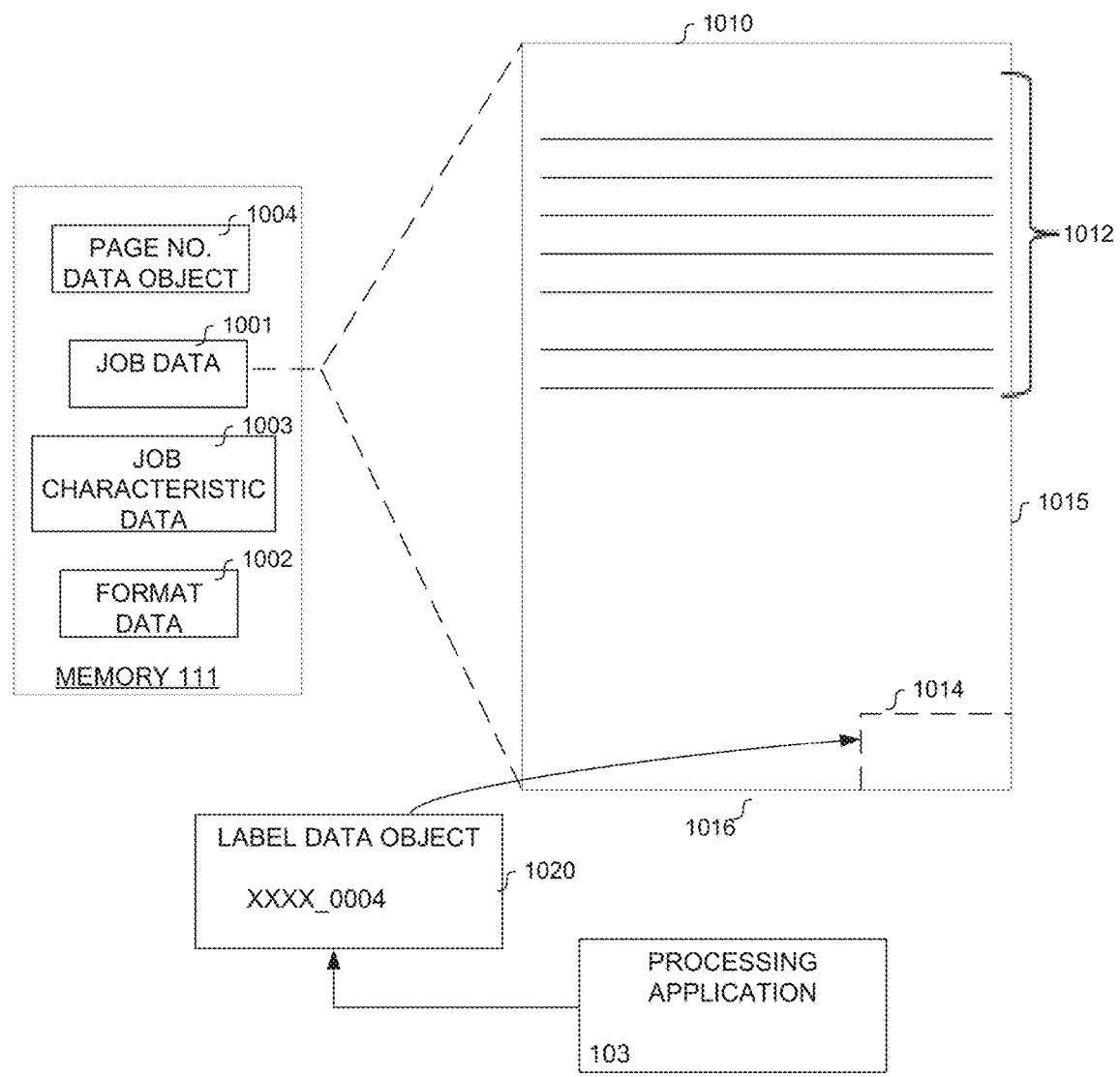

The embedding of the label data object 1020 into the embedding region 1014 of the first document page 1010 is shown in FIG. 10C. Herein, the value derived from the data objects in FIG. 10 have been concatenated together in the format specified in the label data object 1020 of FIG. 10B. The label object shown here is the one shown in FIG. 3 where the matter value is equal to "XXXX" and the document identifier value to be embedded on the first document page 1010 is "0004". Once combined into a single string, the string is embedded directly into the embedding region 1014 of the page 1010.

Figure 10D:
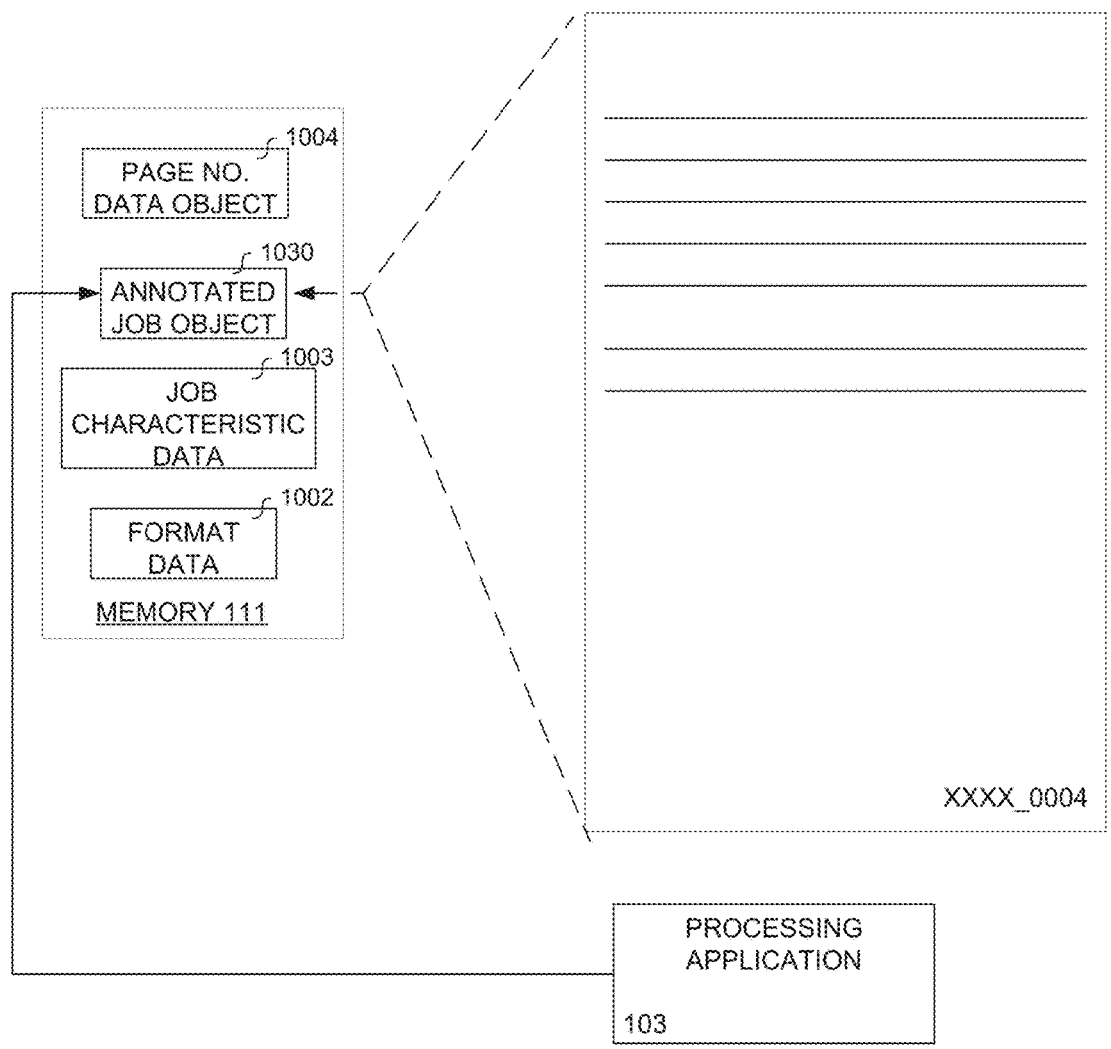

The result is shown in FIG. 10D where the label object data value 1022 is part of the data 1012 contained within the first page 1010 thereby producing an annotated data object 1030 which is caused to be stored in memory 111. This annotated data object 1030 is then communicated to the document manage system as discussed above.

It should be noted that the example described in FIGS. 10A-10D reflects an electronic document having only a single page but the same principle can be readily understood to be applied to an electronic document having a plurality of document pages. In this instance where there are multiple document pages, each subsequently labeled document page is appended to the annotated data object until all document pages have been labeled wherein each of them includes a unique document identifier.

Additionally, the description of each of the various data objects are described to facilitate understanding of the types of data involved in the functionality of the annotation application 103. They need not be embodied as separate and distinct data object and instead could be formed as one or more data objects that are structured in a manner that application 103 understands how to parse and from which particular types of data can be derived and used for one or more functions of application 103.

Turning back to FIG. 9, upon completion of function 908, application 103 generates a metadata file at 909 including information describing the annotated data object generated in 908. This metadata file may be generated in accordance with the description above in FIG. 7 and should at least include a value equal to the document identifier embedded in the final page of the electronic document of the current job thereby enabling the document management system to more easily integrate the electronic document pages of the annotated data object into the particular project to which this document relates. Thereafter, application 103 communicates the metadata file and annotated data object back to the management application 110 of the document management server 106. The data may be communicated via a communication network (e.g. WAN, LAN, etc.). The management application 110 may cause the received metadata file and annotated data object to be stored at a location of the data store 107 in 911.

The functionality of the annotation application according to invention principles allows for a team of users to more accurately create electronic documents that are annotated with the correct document identifier and thereby improves the functionality of the image processing device creating them.

Figure 11:
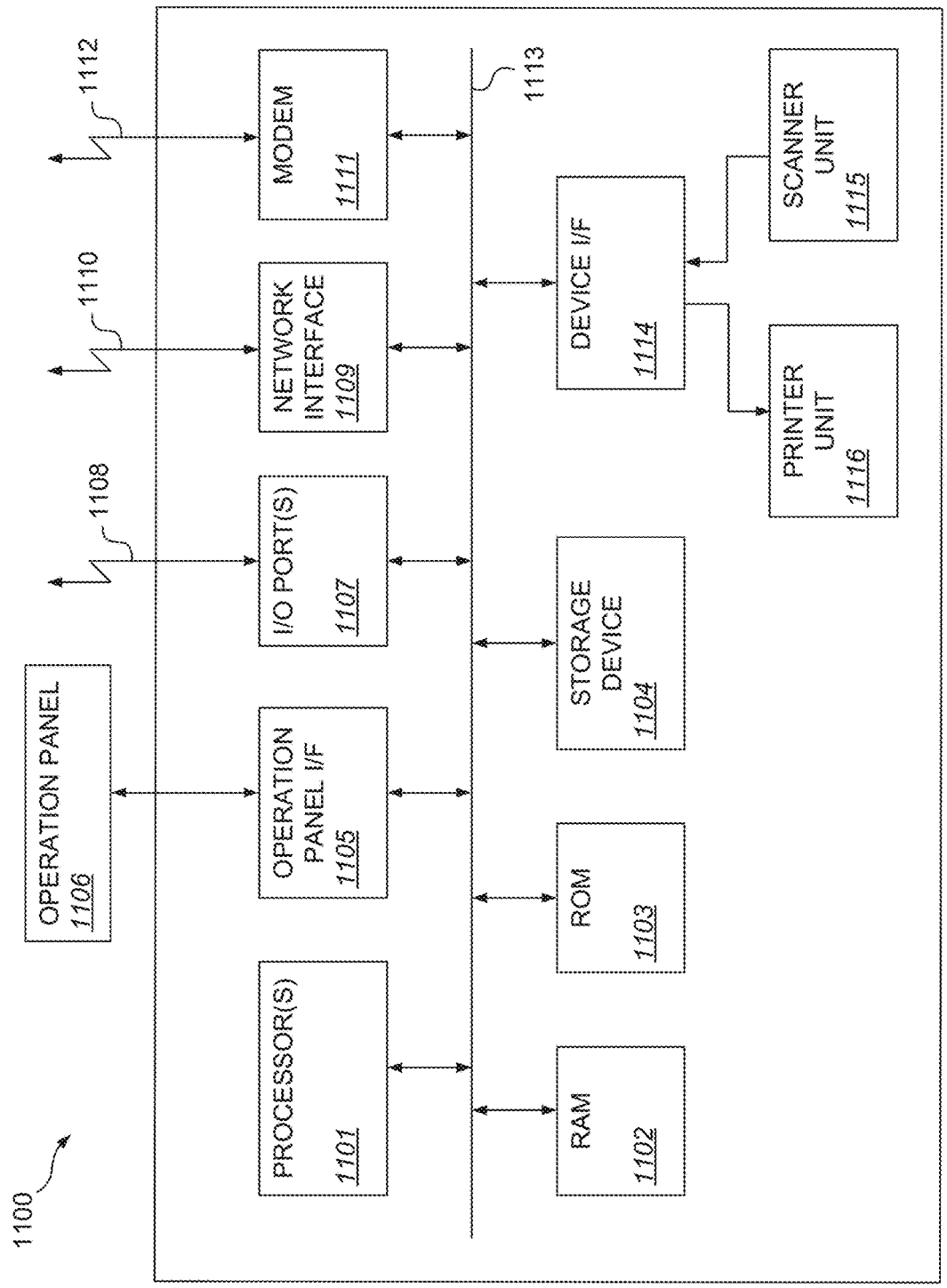
FIG. 11 illustrates an example image processing device.

FIG. 11 illustrates the hardware components of an exemplary server 1100 or any other computing system able with which the image processing device 101 may communicate. According to various embodiments, all or a portion of the description of the server 1100 is applicable to all or a portion of one or more of the server 106 or any other computing system.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the server 1100 performs one or more steps of one or more methods described or illustrated herein. In some embodiments, the server 1100 provides functionality described or illustrated herein. In some embodiments, software running on the server 1100 performs one or more steps of one or more methods described or illustrated herein or provides functionality described or illustrated herein. Some embodiments include one or more portions of the server 1100.

The server 1100 includes one or more processor(s) 1101, memory 1102, storage 1103, an input/output (I/O) interface 1104, a communication interface 1105, and a bus 1106. The server 1100 may take any suitable physical form. For example, and not by way of limitation, the server 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 1101 include hardware for executing instructions, such as those making up a computer program. The processor(s) 1101 may retrieve the instructions from the memory 1102, the storage 1103, an internal register, or an internal cache. The processor(s) 1101 then decode and execute the instructions. Then, the processor(s) 1101 write one or more results to the memory 1102, the storage 1103, the internal register, or the internal cache. The processor(s) 1101 may provide the processing capability to execute the operating system, programs, user and application interfaces, and any other functions of the server 1100.

The processor(s) 1101 may include a central processing unit (CPU), one or more general-purpose microprocessor(s), application-specific microprocessor(s), and/or special purpose microprocessor(s), or some combination of such processing components. The processor(s) 1101 may include one or more graphics processors, video processors, audio processors and/or related chip sets.

In some embodiments, the memory 1102 includes main memory for storing instructions for the processor(s) 1101 to execute or data for the processor(s) 1101 to operate on. By way of example, the server 1100 may load instructions from the storage 1103 or another source to the memory 1102. During or after execution of the instructions, the processor(s) 1101 may write one or more results (which may be intermediate or final results) to the memory 1102. One or more memory buses (which may each include an address bus and a data bus) may couple the processor(s) 1101 to the memory 1102. One or more memory management units (MMUs) may reside between the processor(s) 1101 and the memory 1102 and facilitate accesses to the memory 1102 requested by the processor(s) 1101. The memory 1102 may include one or more memories. The memory 1102 may be random access memory (RAM).

The storage 1103 stores data and/or instructions. As an example and not by way of limitation, the storage 1103 may include a hard disk drive, a floppy disk drive, flash memory, an optical disc, a magneto-optical disc, magnetic tape, or a Universal Serial Bus (USB) drive or a combination of two or more of these. In some embodiments, the storage 1103 is a removable medium. In some embodiments, the storage 1103 is a fixed medium. In some embodiments, the storage 1103 is internal to the server 1100. In some embodiments, the storage 1103 is external to the server 1100. In some embodiments, the storage 1103 is non-volatile, solid-state memory. In some embodiments, the storage 1103 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 1103 may include one or more memory devices. One or more program modules stored in the storage 1103 may be configured to cause various operations and processes described herein to be executed.

The I/O interface 1104 includes hardware, software, or both providing one or more interfaces for communication between the server 1100 and one or more I/O devices. The server 1100 may include one or more of these I/O devices, where appropriate. One or more of these I/O devices may enable communication between a person and the server 1100. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 1104 includes one or more device or software drivers enabling the processor(s) 1101 to drive one or more of these I/O devices. The I/O interface 1104 may include one or more I/O interfaces.

The communication interface 1105 includes hardware, software, or both providing one or more interfaces for communication (such as, for example, packet-based communication) between the server 1100 and one or more other servers or one or more networks. As an example and not by way of limitation, the communication interface 1105 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 1105 for it. As an example and not by way of limitation, the server 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the server 1100 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The server 1100 may include any suitable communication interface 1105 for any of these networks, where appropriate. The communication interface 1105 may include one or more communication interfaces 1105.

The bus 1106 interconnects various components of the server 1100 thereby enabling the transmission of data and execution of various processes. The bus 1106 may include one or more types of bus structures including a memory bus or memory controller, a peripheral bus, and a local bus using any of a variety of bus architectures.

Figure 12:
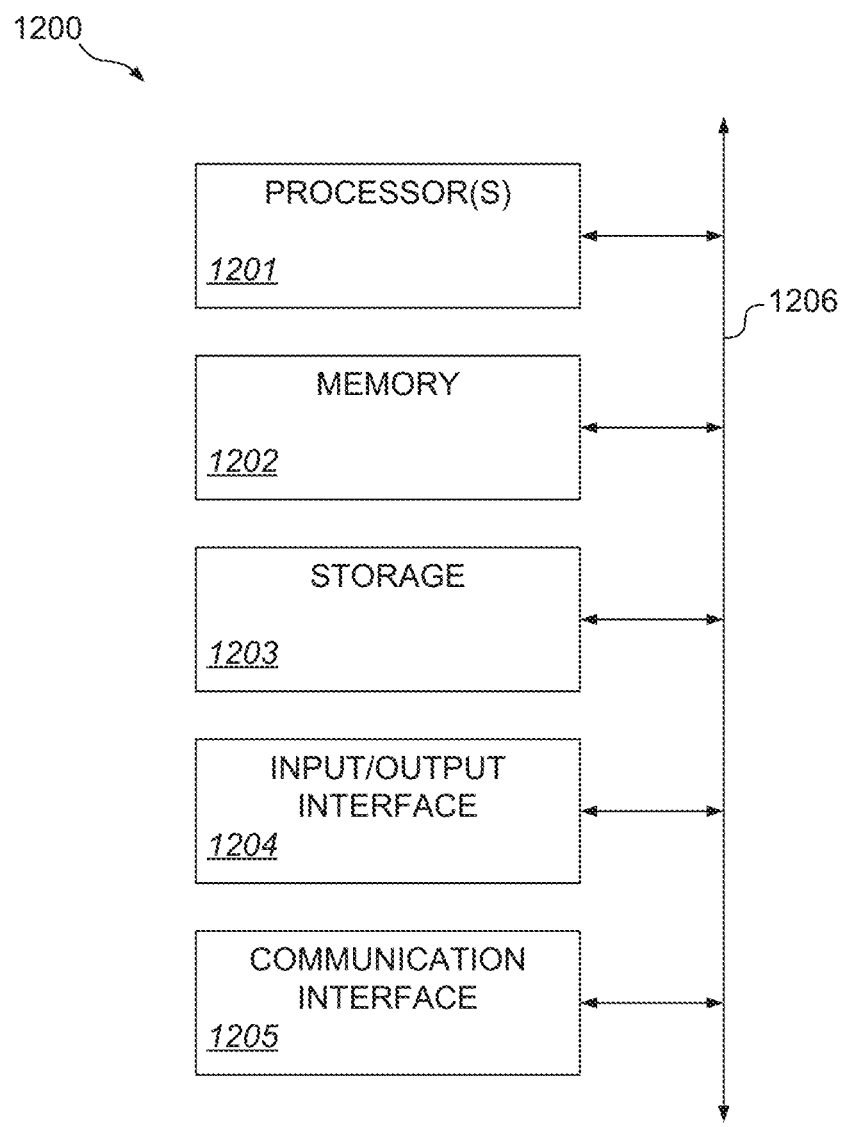
FIG. 12 illustrates an example computing system.

FIG. 12 illustrates an example image processing device 1200 which may be image processing device 101 illustrated in FIGS. 1-10. The image processing device 1200 of FIG. 12 is a multifunction peripheral having a scanning function in addition to printing, copying and other functions. However, it will be understood that various other implementations of an image processing device are within the scope of the present invention. For example, various components, modules, functions, and/or configurations of the image processing device 1200 of FIG. 12 could be combined, deleted, or modified to form further implementations. Further by way of example, in some embodiments, other devices (for example, other devices having scanning capabilities) and/or servers (for example, a computer connected to a scanner) may be implemented as the image processing device 1200.

In some embodiments, the image processing device 1200 performs one or more operations described herein. In some embodiments, the image processing device 1200 provides functionality described herein. In some embodiments, software running on the image processing device 1200 performs one or more operations described herein. In certain embodiments, image processing device 1200 has annotation application 103 described above executing thereon.

The image processing device 1200 includes one or more processor(s) 1201. The processor(s) 1201 include a central processing unit (CPU) that performs overall control functions for the image processing device 1200. The CPU uses a random access memory (RAM) 1202 as a work area while executing instructions. The CPU executes instructions of various programs stored in one or more memory devices. For example, the CPU executes programs stored in a read only memory (ROM) 1203 and in a storage device 1204.

In some embodiments, the processor(s) 1201 include one or more processors in addition to the CPU. By way of example, the processor(s) 1201 may include one or more general-purpose microprocessor(s), application-specific microprocessor(s), and/or special purpose microprocessor(s). Additionally, in some embodiments the processor(s) 1201 may include one or more internal caches for data or instructions.

The processor(s) 1201 provide the processing capability required to execute an operating system, application programs, and various other functions provided on the image processing device 1200. The processor(s) 1201 perform or cause components of the image processing device 1200 to perform various operations and processes described herein, in accordance with instructions stored in one or more memory devices.

The RAM 1202 is used as a work area when the processor(s) 1201 execute various instructions, such as those making up computer programs stored in the ROM 1203 and/or the storage device 1204. The RAM 1202 may be used as a temporary storage area for various data, including input image data. The RAM 1202 may be used as a cache memory. In some embodiments, the RAM may be dynamic RAM (DRAM) or static RAM (SRAM).

The ROM 1203 stores data and programs having computer-executable instructions for execution by the processor(s) 1201. In some embodiments, the ROM 1203 is a boot ROM, storing instructions for the booting process. In some embodiments, the ROM 1203 may be flash memory.

The storage device 1204 stores application data, program modules and other information. One or more program modules stored in the storage device 1204 are configured to cause various operations and processes described herein to be executed. For example, in some embodiments, the storage device 1204 stores instructions for generating and providing to a server a web page including an embedded executable program which, when executed on the server, is operable to obtain a ticket-granting ticket stored on the server and send the ticket-granting ticket to another server; determining whether a user associated with the ticket-granting ticket is authorized to access a protected resource comprising a web page; or a combination of these, in accordance with embodiments described herein. In some embodiments, the application 102 resides on the storage device 1204 and executes on the image processing device 1200.

The storage device 1204 also stores other programs and data to be processed. For example, the storage device 1204 stores an operating system including programs and data for managing hardware and software components of the image processing device 1200. Applications on the image processing device 1200 may utilize the operating system to perform various operations. The storage device 1204 may further store other programs and/or drivers that enable various functions of the image processing device 1200, graphical user interface (GUI) functions, and/or processor functions. The storage device 1204 may also store data files including, for example, image data, user data, configuration information, GUI components, such as graphical elements or templates, or other data required by the image processing device 1200.

In some embodiments, the image processing device 1200 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 1200. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 1205 provides output signals to and receives input signals from an operation panel 1206. Regarding the output signals, the operation panel interface 1205 provides GUI data to the operation panel 1206 for display on a liquid crystal display (LCD). Regarding the input signals, the operation panel interface 1205 receives input signals based on user input operations at the operation panel 1206 and relays the input signals to the processor(s) 1201. In some embodiments, the operation panel 1206 includes a touch sensitive element operable to receive user input operations or commands based on the touching of graphical objects displayed on the LCD. In some embodiments, the operation panel 1206 includes a hard key panel.

The image processing device 1200 includes one or more input/output (I/O) port(s) 1207. The I/O port(s) 1207 may include any suitable interface type such as a universal serial bus (USB) port, FireWire port (IEEE-1394), serial port, parallel port, or AC/DC power connection port. The I/O port(s) 1207 enable one or more external device(s) 12012 to communicate with the image processing device 1200 when the external device(s) 1208 is/are connected to the I/O port(s) 1207. Examples of external devices 1208 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 1209 includes hardware, software, or both providing one or more interfaces for communication (such as, for example, packet-based communication) between the image processing device 1200 and one or more other servers or one or more networks 1210. As an example and not by way of limitation, the network interface 1209 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 1210 and any suitable network interface 1209 for it. As an example and not by way of limitation, the image processing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 1210 may be wired or wireless. As an example, the image processing device 1200 may communicate with a wireless PAN (WPAN) (such as, for example, a BLUETOOTH WPAN), a WI-FI network, a WI-MAX network, or other suitable wireless network or a combination of two or more of these. The image processing device 1200 may include any suitable network interface 1209 for any of these networks 1210, where appropriate.

A system bus 1211 interconnects various components of the image processing device 1200 thereby enabling the transmission of data and execution of various processes. The system bus 1211 may include one or more types of bus structures including a memory bus or memory controller, a peripheral bus, and a local bus using any of a variety of bus architectures.

The device interface 1212 is connected to the scanner unit 1213 and to the printer unit 1214. The device interface 1212 performs synchronous/asynchronous conversion of image data.

The scanner unit 1213 includes a light source and an image sensor. The scanner unit 1213 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 1213 includes an optical system (for example, mirrors, lens) that directs the light to the image sensor. After the image sensor generates the electrical signals, an analog-to-digital converter converts the electrical signals to digital image data representing the scanned physical document. The scanner unit 1213 then outputs the digital image data to one or more other components of the image processing device 1200 via the device interface 1212.

The printer unit 1214 is an image output device for printing on a sheet an image corresponding to image data. In response to a print command received at the image processing device 1200, the printer unit 1214 receives image data via the device interface 1212 and outputs to a sheet an image corresponding to the image data.

Various above-described operations performed by the client servers 110 and/or 120, the server 106 and/or 140, may be executed and/or controlled by one or more applications running on these system, respectively. The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

I claim:

1. An image processing device comprising:
   a user interface that receives from a user;
   a scanner;
   one or more processors; and
   a memory storing instructions that, when executed by the one or more processors, cause the one or more processors to
      cause the scanner to scan at least one physical document having at least one page;

generate an electronic document including data representative of the at least one physical document having the at least one page scanned by the scanner, the electronic document being generated for incorporation into a document project, managed by a document management system, having a previously stored electronic document different from the generated electronic document;

acquire, based on input received from a user via the user interface an end document identifier that identifies an entirety of a last page of the previously stored electronic document included in the document project managed by the document management system;

determine, from the acquired end document identifier, a unique document identifier value to identify an entirety of the at least one page of the generated electronic document to be added to the document project;

generate an annotated electronic document, different from the generated electronic document, modifying the generated electronic document to embed data representing the determined unique document identifier within the at least one page of the generated electronic document such that the embedded data representing the unique identifier is visible when viewing the annotated electronic document;

generate, based on the input received from the user at the user interface an information file including at least one characteristic associated with the annotated electronic document and used to update one or more data fields of the document project managed by the document management system; and communicate the information file and the annotated electronic document to the document management system for incorporation into the document project stored therein such that the document project includes the annotated electronic document, the associated information file and the previously stored electronic document, wherein the document project is automatically updated to include the at least one characteristic and the end identifier of the document project is updated to be a unique identifier on a last page of the annotated electronic document from which subsequent unique document identifiers are determined.

2. The image processing device according to claim 1, wherein
the unique document identifier follows, in sequence, the end document identifier value and enables seamless incorporation into the electronic document project.

3. The image processing device according to claim 1, wherein the document management system executes on one or more servers, and the instructions, when executed by the one or more processors cause the one or more processors to
acquire, via a communications network, format data from the document management system executing on one or more servers, the format data including at least the end document identifier value.

4. The image processing device according to claim 3, wherein the format data further includes at least one type of job characteristic data describing at least one aspect of the electronic document project, wherein
the at least one type of job characteristic includes at least one of (a) a matter identifier that identifies the matter that the electronic document or project is associated; (b) client identifier identifying a client that the electronic document or project is associated; (c) an author who has created the electronic document or project; and (d) a type of document.

5. The image processing device according to claim 4, wherein
the format data includes data identifying a structure of a label value to be embedded within respective document pages of the at least one electronic document, the label value data including at least one type of job characteristic and the unique document identifier.

6. The image processing device according to claim 5, wherein the instructions, when executed by the one or more processors cause the one or more processors to
generate, using the format data, the annotated electronic document data by concatenating, into a label value string, the at least one job characteristic data and unique document identifier.

7. The image processing device according to claim 1, wherein the instructions, when executed by the one or more processors cause the one or more processors to
create a region within the at least one page of the electronic document using region information data that defines a predetermined area on the at least one page, the created region defining a position within the at least one page to embed the unique document identifier.

8. The image processing device according to claim 1, wherein the instructions, when executed by the one or more processors cause the one or more processors to
in response to determining that the electronic document being generated for inclusion into the document project includes a plurality of document pages, generate the annotated electronic document by,
for the first page, embedding the generated unique document identifier in the first page; and
for each subsequent page, generating a subsequent unique document identifiers and embedding the subsequent unique identifier within each subsequent page of the electronic document, wherein each of the plurality of pages will have respective unique document identifiers embedded therein.

9. The image processing device according to claim 1, wherein the instructions, when executed by the one or more processors cause the one or more processors to
generate an image files representing one of the unique document identifier; and
embed the generated image file within respective pages of the electronic document.

10. A method of operating an image processing device that includes a scanner and a user interface that receives input from a user, the method comprising:
causing the scanner to scan at least one physical document having at least one page;
generating an electronic document including data representative of the at least one physical document having the at least one page scanned by the scanner for incorporation into a document project, managed by a document management system, having a previously stored electronic document different from the electronic document being generated;
acquiring, based on input received from a user via the user interface an end document identifier that identifies an entirety of a last page of the previously stored electronic document included in the document project managed by the document management system;
determining, from the acquired end document identifier, a unique document identifier value to identify an entirety of the at least one page of the generated electronic document to be added to the document project by obtaining, from the document management system, an end document identifier value that identifies an entirety of a last page of the previously stored electronic document included in the document project;

generating an annotated electronic document, different from the generated electronic document by modifying the generated electronic document to embed data representing the unique document identifier within the at least one page of the electronic document data such that the embedded data representing the unique identifier is visible when the viewing the annotated electronic document;

generating, based on the input received from the user at the user interface, an information file including at least one characteristic associated with the annotated electronic document and used to update one or more data fields of the document project by the document management system; and communicating the information file and the annotated electronic document to the document management system for incorporation into the document project stored therein such that the document project includes the annotated electronic document, the associated information file and the previously stored electronic document, wherein the document project is automatically updated to include the at least one characteristic and the end identifier of the document project is updated to be the a unique identifier on a last page of the annotated electronic document from which subsequent unique document identifiers are determined.

11. The method according to claim 10, wherein
the unique document identifier follows, in sequence, the end document identifier value and enables seamless incorporation into the electronic document project.

12. The method according to claim 11, wherein the document management system executes on one or more servers and, further comprising acquiring, via a communications network, format data from the document management system executing on one or more servers, the format data including at least the end document identifier value.

13. The method claim 12, wherein
the format data further includes at least one type of job characteristic data describing at least one aspect of the electronic document project, wherein
the at least one type of job characteristic includes at least one of (a) a matter identifier that identifies the matter that the electronic document or project is associated; (b) client identifier identifying a client that the electronic document or project is associated; (c) an author who has created the electronic document or project; and (d) a type of document.

14. The method according to claim 13, wherein
the format data includes data identifying a structure of a label value to be embedded within respective document pages of the at least one electronic document, the label value data including at least one type of job characteristic and the unique document identifier.

15. The method according to claim 14, further comprising
generating, using the format data, the annotated electronic document data by concatenating, into a label value string, the at least one job characteristic data and unique document identifier.

16. The method according to claim 10, further comprising
creating a region within the at least one page of the electronic document using region information data that defines a predetermined area on the at least one page, the created region defining a position within the at least one page to embed the unique document identifier.

17. The method according to claim 10, further comprising
in response to determining that the electronic document data being generated for inclusion into the document project includes a plurality of document pages, generating the annotated electronic document by,
for the first page, embedding the generated unique document identifier in the first page; and
for each subsequent page, generating a subsequent unique document identifiers and embedding the subsequent unique identifier within each subsequent page of the electronic document, wherein each of the plurality of pages will have respective unique document identifiers embedded therein.

18. The method according to claim 10,
generating an image files representing one of the unique document identifier; and
embedding the generated image file within respective pages of the electronic document.

19. A non-transitory computer readable medium storing a set of instructions, that when executed by one or more processors of an image processing device including a scanner and a user interface that receives input from a user, cause the one or more processors to cause the scanner to scan at least one physical document having at least one page;

generate an electronic document including data representative of the at least one physical document having the at least one page scanned by the scanner, the electronic document being generated for incorporation into a document project, managed by a document management system, having a previously stored electronic document different from the electronic document;

acquire, based on input received from a user via the user interface an end document identifier that identifies an entirety of a last page of the previously stored electronic document included in the document project managed by the document management system;

determine, from the acquired end document identifier, a unique document identifier value to identify an entirety of the at least one page of the generated electronic document to be added to the document project;

generate an annotated electronic document, different from the generated electronic document, modifying the generated electronic document to embed data representing the determined unique document identifier within the at least one page of the generated electronic document such that the embedded data representing the unique identifier is visible when viewing the annotated electronic document;

generate, based on the input received from the user at the user interface an information file including at least one characteristic associated with the annotated electronic document and used to update one or more data fields of the document project managed by the document management system; and communicate the information file and the annotated electronic document to the document management system for incorporation into the document project stored therein such that the document project includes the annotated electronic document, the associated information file and the previously stored electronic document, wherein the document project is automatically updated to include the at least one characteristic and the end identifier of the document project is updated to be a unique identifier on a last page of the annotated electronic document from which subsequent unique document identifiers are determined.

* * * * *